US012661649B2

(12) United States Patent
Qian et al.

(10) Patent No.: US 12,661,649 B2
(45) Date of Patent: Jun. 23, 2026

(54) MICROFLUIDIC CHIP

(71) Applicant: SHENZHEN YHLO BIOTECH CO., LTD., Shenzhen (CN)

(72) Inventors: Chungen Qian, Shenzhen (CN); Ming Huang, Shenzhen (CN); Bifeng Liu, Shenzhen (CN); Peng Chen, Shenzhen (CN); Yujin Xiao, Shenzhen (CN); Kunhui Hu, Shenzhen (CN)

(73) Assignee: SHENZHEN YHLO BIOTECH CO., LTD., Shenzhen (CN)

( * ) Notice: Subject to any disclaimer, the term of this patent is extended or adjusted under 35 U.S.C. 154(b) by 524 days.

(21) Appl. No.: 18/276,587

(22) PCT Filed: Jan. 19, 2022

(86) PCT No.: PCT/CN2022/072683

§ 371 (c)(1),
(2) Date: Sep. 15, 2023

(87) PCT Pub. No.: WO2022/170930

PCT Pub. Date: Aug. 18, 2022

(65) Prior Publication Data

US 2024/0307872 A1 Sep. 19, 2024

(30) Foreign Application Priority Data

Feb. 9, 2021 (CN) ......................... 202110175702.3

(51) Int. Cl.
*B01L 3/00* (2006.01)

(52) U.S. Cl.
CPC ..... *B01L 3/50273* (2013.01); *B01L 3/502738* (2013.01); *B01L 3/5027* (2013.01);
(Continued)

(58) Field of Classification Search
CPC ........... B01L 3/50273; B01L 3/502738; B01L 3/5027; B01L 2200/10; B01L 2200/16;
(Continued)

(56) References Cited

U.S. PATENT DOCUMENTS 8,534,319 B2 9/2013 Bergeron et al.
9,746,413 B2 8/2017 Handique et al.
(Continued)

FOREIGN PATENT DOCUMENTS

CN 101715553 A 5/2010
CN 103998394 A 8/2014
(Continued)

OTHER PUBLICATIONS

Extended European Search Report for European application No. 21865843.3, mailed Jun. 19, 2024, (10 pages).
(Continued)

*Primary Examiner* — Benjamin R Whatley
(74) *Attorney, Agent, or Firm* — Kagan Binder, PLLC

(57) ABSTRACT

The present invention relates to a microfluidic chip, a reagent output structure thereof comprising a reagent storage chamber, a first centrifugal-force flow channel and a time delay unit. The time delay unit comprises a first diverting flow channel, a capillary-force flow channel, a second diverting flow channel and a second centrifugal-force flow channel. The first centrifugal-force flow channel extends away from the centre of rotation. The other end of the first diverting flow channel is in communication with one end of the capillary-force flow channel, the capillary-force flow channel extends towards the centre of rotation, the other end of the capillary-force flow channel is in communication with one end of the second diverting flow channel, the other end of the second diverting flow channel is in communication with the second centrifugal-force flow channel, and the
(Continued)

second centrifugal-force flow channel extends away from the centre of rotation.

7 Claims, 11 Drawing Sheets

(52) U.S. Cl.
CPC ....... *B01L 2200/10* (2013.01); *B01L 2200/16* (2013.01); *B01L 2300/0803* (2013.01); *B01L 2300/0861* (2013.01); *B01L 2300/0883* (2013.01); *B01L 2300/0887* (2013.01); *B01L 2300/161* (2013.01); *B01L 2400/0406* (2013.01); *B01L 2400/0409* (2013.01); *B01L 2400/0688* (2013.01)

(58) Field of Classification Search
CPC ..... B01L 2300/0803; B01L 2300/0861; B01L 2300/0883; B01L 2300/0887; B01L 2300/161; B01L 2400/0406; B01L 2400/0409; B01L 2400/0688; B01L 2400/088
See application file for complete search history.

(56) References Cited

U.S. PATENT DOCUMENTS

| | | | |
|---|---|---|---|
| 2011/0020194 | A1 | 1/2011 | Lee et al. |
| 2011/0117634 | A1 | 5/2011 | Halamish et al. |
| 2012/0301867 | A1 | 11/2012 | Kumo et al. |
| 2014/0017806 | A1 | 1/2014 | Lee |
| 2014/0134631 | A1 | 5/2014 | Clime et al. |
| 2016/0121329 | A1 | 5/2016 | Kinahan et al. |
| 2017/0333901 | A1 | 11/2017 | Sun et al. |
| 2018/0304223 | A1 | 10/2018 | Davies et al. |
| 2019/0072547 | A1 | 3/2019 | Ahn et al. |
| 2023/0241614 | A1 | 8/2023 | Li et al. |
| 2023/0251250 | A1 | 8/2023 | Zheng et al. |

FOREIGN PATENT DOCUMENTS

| | | | |
|---|---|---|---|
| CN | 104293666 | A | 1/2015 |
| CN | 104502594 | A | 4/2015 |
| CN | 104694372 | A | 6/2015 |
| CN | 105316224 | A | 2/2016 |
| CN | 105498875 | A | 4/2016 |
| CN | 105562130 | A | 5/2016 |
| CN | 105618167 | A | 6/2016 |
| CN | 105785005 | A | 7/2016 |
| CN | 106076441 | A | 11/2016 |
| CN | 206292243 | U | 6/2017 |
| CN | 107338183 | A | 11/2017 |
| CN | 108535228 | A | 9/2018 |
| CN | 108823088 | A | 11/2018 |
| CN | 109012774 | A | 12/2018 |
| CN | 109030813 | A | 12/2018 |
| CN | 109212201 | A | 1/2019 |
| CN | 109395788 | A | 3/2019 |
| CN | 109517728 | A | 3/2019 |
| CN | 109884328 | A | 6/2019 |
| CN | 110045102 | A | 7/2019 |
| CN | 110093254 | A | 8/2019 |
| CN | 110152747 | B | 8/2019 |
| CN | 110260026 | A | 9/2019 |
| CN | 110508335 | A | 11/2019 |
| CN | 110713923 | A | 1/2020 |
| CN | 209974793 | U | 1/2020 |
| CN | 210510505 | U | 5/2020 |
| CN | 111330660 | A | 6/2020 |
| CN | 210787395 | U | 6/2020 |
| CN | 111454831 | A | 7/2020 |
| CN | 111957360 | A | 11/2020 |
| CN | 111965345 | A | 11/2020 |
| CN | 211865061 | U | 11/2020 |
| CN | 112275337 | A | 1/2021 |
| CN | 112808336 | A | 5/2021 |
| CN | 113019485 | A | 6/2021 |
| CN | 214636503 | U | 11/2021 |
| JP | 2011163830 | A | 8/2011 |
| WO | 2011027832 | A1 | 3/2011 |
| WO | 2019006978 | A1 | 1/2019 |
| WO | 2019040637 | A1 | 2/2019 |
| WO | 2022048374 | A1 | 3/2022 |
| WO | 2022052787 | A1 | 3/2022 |

OTHER PUBLICATIONS

Lin et al., "Microfluidic Immunoassays," Journal of the Association for Laboratory Automation, Technology Review, vol. 15, Isse. 3, Jun. 1, 2010, (23 pages).
Park et al., "Lab-on-a-Disc for Fully Integrated Multiplex Immunoassays," Analytical Chemistry, vol. 84, pp. 2133-2140, Jan. 25, 2012 (8 pages).
Strohmeier et al., "Centrifugal microfluidic platforms: advanced unit operations and applications," Chem Soc Rev, vol. 44, pp. 6187-6229, 2015, (43 pages).
Tang et al., "A Review of Biomedical Centrifugal Microfluidic Platforms," Micromachines, vol. 7, No. 2, Feb. 2016, (29 pages).
International Search Report and Written Opinion, and English Translation therefore, for International Application No. PCT/CN2022/072683, mailed Mar. 24, 2022, (23 pages).
Ruyuan et al., "Design and Fabrication of the Siphon Valve on the Centrifugal Chip," Micronanoelectronic Technology, vol. 51, No. 3, pp. 156-160, Mar. 2014, (5 pages).
Extended European Search Report for European Application No. 22752092.1, mailed Feb. 18, 2025, 9 pages.
Supplemental Search Report for Chinese Application No. 2021101757023, mailed Feb. 9, 2021, 2 pages.
International Search Report and Written Opinion, and English Translation thereof, for International Application No. PCT/CN2022/072673, mailed Mar. 23, 2022 (16 pages).
First Chinese Office Action and Search Report for Counterpart Chinese Application No. 202110337803.6, mailed Jan. 28, 2022, (15 pages).
Second Chinese Office Action for Counterpart Chinese Application No. 202110337803.6, mailed Jun. 21, 2022, (19 pages).
International Search Report, and English Translation thereof, and Written Opinion for International Application No. PCT/CN2021/110216, mailed Nov. 4, 2021, (17 pages).
International Search Report, and English Translation thereof, and Written Opinion for International Application No. PCT/CN2021/113725, mailed Nov. 1, 2021, (17 pages).
Qian et al., Unpublished United States 371 U.S. Appl. No. 18/284,706, filed Sep. 28, 2023, (No Copy Enclosed).
Extended European Search Report for European Application No. 21863442.6, mailed May 24, 2024, (8 pages).

MICROFLUIDIC CHIP

CROSS-REFERENCE TO RELATED APPLICATIONS

This application is an U.S. national phase application under 35 U.S.C. § 371 based upon international patent application No. PCT/CN2022/072683 filed on Jan. 19, 2022, which itself claims priority to Chinese patent application No. 202110175702.3, filed on Feb. 9, 2021. The contents of the above identified applications are hereby incorporated herein in their entireties by reference.

TECHNICAL FIELD

The present disclosure relates to the technical field of microfluidics, in particular to a microfluidic chip.

BACKGROUND

Chemiluminescence immunoassay refers to a class of methods or techniques for detecting the content of antigens or antibodies in a sample by combining highly specific immune reaction between antigen and antibody with highly sensitive chemiluminescence detection based on generation of photons by chemical reactions without excitation of external light source, heat source or electric field.

Point of care testing (POCT) refers to a class of methods for clinical testing that is performed at or near the patient, which usually performs immediate analysis at the sampling site to quickly obtain test results, thereby simplifying the complicated processing procedures in laboratory test.

Microfluidic chips are a current hot spot in development of miniaturized total analysis systems, and can be used to perform the POCT in the chemiluminescence immunoassay. The microfluidic chip integrates a series of experiments involved in fields of biology, chemistry and medicine, including sample pretreatment, sample reaction and result reading, into a chip with a micro/nano structure, with characteristics such as less demand on samples, less reagent consumption, rapid reaction and accurate results. Centrifugal microfluidic chips are one kind of microfluidic chips, which use centrifugal force as power to drive samples or reagents to move in microchannels of the chip, thereby realizing detection. Usually, multiple elementary units for completing a type of reactions are integrated onto one chip to detect multiple samples. For the centrifugal microfluidic chip, the speed of centrifugation is often adjusted to obtain different centrifugal forces, so as to control the movement of liquid on the chip. The centrifugal microfluidic chip has advantages such as highly symmetrical structure, large sample loading capacity; small demand for external drive power, less supporting facilities, high degree of automation, accurate measurement results, and good repeatability.

Microfluidic valves refer to special structural designs on the microfluidic chips that can inhibit the flow of liquid and can be controlled to freely open and close to regulate liquid flow; such as capillary; surface modification, thin film, etc.

Most valves in conventional centrifugal microfluidic chips instantaneously control the liquid flow; which cannot produce a delay effect, cannot accurately regulate the adding sequence of liquid flows, and cannot complete complicated multi-step chemical reactions.

SUMMARY

Accordingly, it is necessary to provide a microfluidic chip with a reagent output structure that exhibits a delay effect.

A microfluidic chip has a rotation center and a reagent output structure. The reagent output structure includes a reagent storage chamber, a first centrifugal-force flow channel, and a delay unit. The delay unit includes a first turning flow channel, a capillary-force flow channel, a second turning flow channel, and a second centrifugal-force flow channel. The first centrifugal-force flow channel extends away from the rotation center after being led out from the reagent storage chamber. One end of the first turning flow channel is in communication with the first centrifugal-force flow channel, and another end of the first turning flow channel is in communication with one end of the capillary-force flow channel. The capillary-force flow channel extends close to the rotation center after being led out from the first turning flow channel. One end of the second turning flow channel is in communication with another end of the capillary-force flow channel, and another end of the second turning flow channel is in communication with the second centrifugal-force flow channel. The second centrifugal-force flow channel extends away from the rotation center after being led out from the second turning flow channel. The first centrifugal-force flow channel has a first discharge microfluidic valve. The second centrifugal-force flow channel has a second discharge microfluidic valve.

In one embodiment, the first discharge microfluidic valve is a hydrophobic valve or a capillary valve.

In one embodiment, the second discharge microfluidic valve is a hydrophobic valve or a capillary valve.

In one embodiment, a plurality of delay units are provided. The plurality of delay units are communicated successively. The first turning flow channel of a latter delay unit is in communication with the second centrifugal-force flow channel of a former delay unit.

In one embodiment, a plurality of reagent output structures are provided. The plurality of reagent output structures surround the rotation center and are distributed at intervals. At least one reagent output structure includes a plurality of delay units. The plurality of delay units are communicated successively. The first turning flow channel of a latter delay unit is in communication with the second centrifugal-force flow channel of a former delay unit. At least one reagent output structure has a different number of delay units as compared to other reagent output structures.

In one embodiment, the number of the delay units in each reagent output structure is different from the number of the delay units in other reagent output structures.

In one embodiment, among the plurality of delay units that are communicated successively, the latter delay unit is farther away from the corresponding reagent storage chamber than the former delay unit.

In one embodiment, the microfluidic chip further includes a second area distributing chamber, and a plurality of reaction chambers. The second area distributing chamber extends around the rotation center and is in communication with the plurality of reagent output structures. The plurality of reaction chambers are in communication with the plurality of second area distributing chambers, respectively. The distances from the reagent output structure, the second area distributing chamber, and the reaction chamber to the rotation center gradually increase.

In one embodiment, the microfluidic chip further includes a common reagent layer and a reaction layer that are laminated.

The common reagent layer has the reagent output structure, the second area distributing chamber, a second area sample addition hole, a second area first microfluidic channel, and a plurality of second area second connecting ports.

The plurality of second area second connecting ports are distributed along an extending direction of the second area distributing chamber. The plurality of second area second connecting ports are in communication with the second area distributing chamber, respectively. The second area second connecting port is farther away from the rotation center than the second area distributing chamber.

The reaction layer has a distribution and reaction structure. The distribution and reaction structure includes a first area sample addition hole, a first area distributing chamber, and a reaction unit. The first area sample addition hole is in communication with the first area distributing chamber. The reaction unit includes a first area first microfluidic channel, and the 30) reaction chamber. The reaction chamber is in communication with the first area distributing chamber via the first area first microfluidic channel. The first area distributing chamber extends around the rotation center. The distribution and reaction structure has a plurality of reaction units. The plurality of reaction units are distributed along an extending direction of the first area distributing chamber. The first area distributing chamber is closer to the rotation center than the reaction chamber. The first area sample addition hole is in communication with the second area sample addition hole. The reaction chamber is in communication with the second area second connecting port.

In one embodiment, the reaction unit further includes a first area first reagent inlet port, and a first area eighth microfluidic channel. The first area first reagent inlet port is in communication with the reaction chamber via the first area eighth microfluidic channel. The first area first reagent inlet port is closer to the rotation center than the reaction chamber. The second area second connecting port is in communication with the reaction chamber via the first area first reagent inlet port and the first area eighth microfluidic channel.

In one embodiment, the distribution and reaction structure further includes a separation chamber and a first area second microfluidic channel. The separation chamber is in communication with the first area distributing chamber via the first area second microfluidic channel. The separation chamber is closer to the rotation center than the first area distributing chamber.

In one embodiment, the distribution and reaction structure further includes a first area fourth microfluidic channel and a waste liquid storage chamber. The reaction chamber is in communication with the waste liquid storage chamber via the first area fourth microfluidic channel. The waste liquid storage chamber is farther away from the rotation center than the reaction chamber.

In one embodiment, the first area distributing chamber is in communication with the waste liquid storage chamber via the first area sixth microfluidic channel.

In one embodiment, the microfluidic chip includes a plurality of distribution and reaction structures. The plurality of distribution and reaction structures are distributed around the rotation center and arranged at intervals.

Compared to the related art, the microfluidic chip described above has the following beneficial effects.

The reagent output structure in the aforementioned microfluidic chip can delay the output time of the reagent from the reagent storage chamber to other liquid channels other than the reagent output structure. During the test, by increasing the speed of centrifugation, the reagent in the reagent storage chamber breaks through the a first discharge microfluidic valve 262 on the first centrifugal-force flow channel, and enters the first turning flow channel of the delay unit. At this time, since the centrifugal force is greater than the capillary force, the reagent remains within the first turning flow channel. The speed of centrifugation is then decreased, at this time, the centrifugal force is less than the capillary force, the reagent within the first turning flow channel enters the capillary-force flow channel, enters the second turning flow channel, and reaches in front of a second discharge microfluidic valve of the second centrifugal-force flow channel. The speed of centrifugation is increased, the reagent breaks through the second discharge microfluidic valve and is output from the second centrifugal-force flow channel. As such, after several rounds of increase and decrease of the centrifugal speed, the reagent can be outputted through the delay unit. The aforementioned microfluidic is suitable for reactions that need to control the reagent output time and reaction sequence, especially for reactions that need to apply multiple reagents successively, so that the application time of the multiple reagents can be controlled and multi-step reactions can be performed. Therefore, the aforementioned microfluidic chip can perform relatively complex reactions, avoiding the complexity of operation during test.

Figure 1:
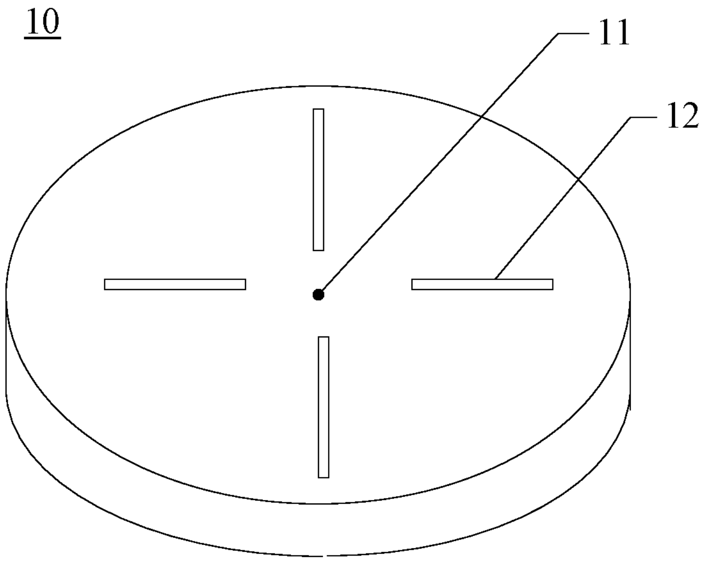
FIG. 1 is a structural schematic view of a microfluidic chip according to an embodiment of the present disclosure.

10. microfluidic chip; 11. rotation center; 100. sample and solvent addition layer; 101. third area solvent addition hole; 103. third area sample addition hole; 104. third area first connecting port; 105. third area first microfluidic valve; 106. third area second microfluidic valve; 107. third area distributing chamber; 108. third area third microfluidic valve; 109. third area material storage chamber; 110. third area fourth microfluidic valve; 111. third area second connecting port; 112. third vent hole; 113. reagent adding groove; 114. feed permeation hole; 115. feed microfluidic channel; 116. first feed microfluidic valve; 1161. first segment; 1162. second segment; 1163. third segment; 117. second feed microfluidic valve; 121. third area first microfluidic channel; 122. third area second microfluidic channel; 123. third area third microfluidic channel; 124. third area fourth microfluidic channel; 125. third area fifth microfluidic channel; 130. storage unit.

200. common reagent layer; 201. second area solvent addition hole; 202. reagent storage chamber; 2021. first storage sub-chamber; 2022. second storage sub-chamber; 2023. third storage sub-chamber; 203. connecting port; 204. second area sample addition hole; 207. second area distributing chamber; 208. second area first microfluidic valve; 209. second area first connecting port; 210. second area second connecting port; 211. second area second microfluidic channel; 212. second area third connecting port; 230. liquid distribution unit; 240. reagent output structure; 221. second area first microfluidic channel; 260. reagent output channel; 261. first centrifugal-force flow channel; 262. first discharge microfluidic valve; 263. delay unit; 2631. first turning flow channel; 2632. capillary-force flow channel; 2633. second turning flow channel; 2634. second centrifugal-force flow channel; 2635. second discharge microfluidic valve.

300. reaction layer; 330. distribution and reaction structure; 301. first area sample addition hole; 302. separation chamber; 3021. first side surface; 3022. second side surface; 3023. third side surface; 304. first area distributing chamber; 332. reaction unit; 305. first area first microfluidic valve; 306. reaction chamber; 307. first area second reagent inlet port; 308. first area first reagent inlet port; 309. first area second microfluidic valve; 310. waste liquid storage chamber; 312. backflow prevention valve; 321. first area first microfluidic channel: 322. first area second microfluidic channel; 3221. first sub-flow channel; 3222. second sub-flow channel; 3223. third sub-flow channel; 323. first area third microfluidic channel; 324. first area fourth microfluidic channel; 325. first area fifth microfluidic channel; 326. first area sixth microfluidic channel; 327. first area seventh microfluidic channel; 328. first area eighth microfluidic channel; 329. first area ninth microfluidic channel; 401. first vent hole; 402. second vent hole.

DETAILED DESCRIPTION OF THE EMBODIMENTS

In order to make the present disclosure understandable, the present disclosure is described in detail below with reference to the drawings. Many embodiments of the present disclosure are set forth in the drawings. However, the present disclosure can be implemented in many different forms and is not limited to the embodiments described herein. Rather, these embodiments are provided to make the contents of the present disclosure to be more thoroughly and comprehensively understood.

It should be noted that an element, when being referred to as being "communicated" with another element, it may be directly communicated with the other element or there may be both centered elements. The terms "vertical", "horizontal", "left", "right" and similar expressions used herein are for illustrative purposes only and are not intended to be the exclusive means of implementation.

In the description of the present disclosure, it should be understood that the terms "a first area", "a second area", "a third area", "first", "second", "third", etc. are only used for descriptive purposes and cannot be understood as indicating or implying relative importance or implicitly indicating the quantity or order of the indicated technical features.

Unless otherwise defined, all technical and scientific terms used herein have the same meaning as normally understood by those skilled in the art to which the present disclosure belongs. The terms used herein in the specification of the present disclosure are for the purpose of describing specific embodiments only and are not intended to limit the present disclosure. The term "and/or" as used herein includes any and all combinations of one or more related listed items.

As shown in FIG. 1, the present disclosure provides a microfluidic chip 10. The microfluidic chip 10 has a rotation center 11. The microfluidic chip 10 has cavity structures 12 that are specially designed thereon. When rotated and centrifuged, the microfluidic chip 10 rotates around the rotation center 11 as the center. The fluid can flow in the cavity structure 12 under the action of centrifugal force or capillary force, so as to achieve the purpose of test and detection.

Figure 2:
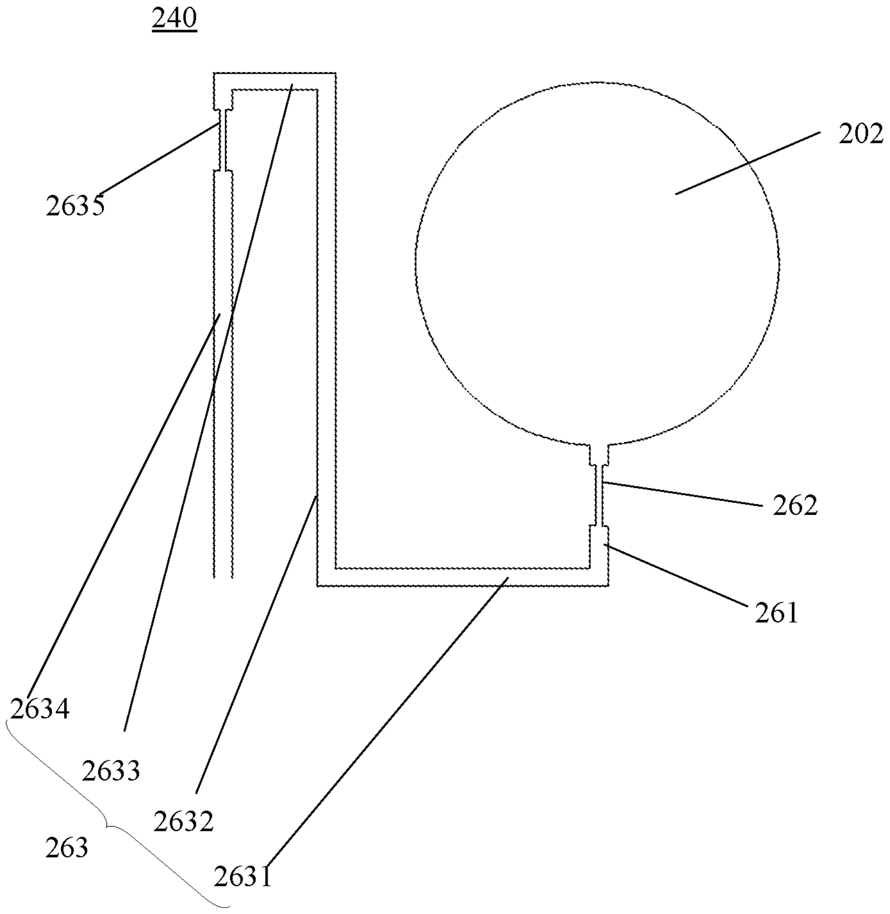
FIG. 2 is a structural schematic view of a form of a reagent output structure in the microfluidic chip shown in FIG. 1.
Figure 3:
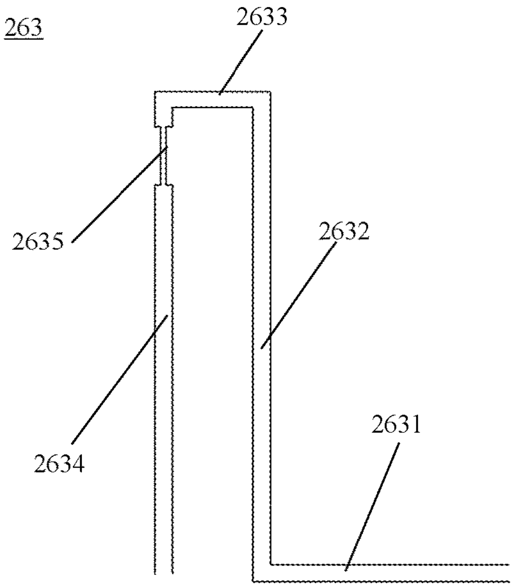
FIG. 3 is a structural schematic view of a delay unit.

Referring to FIG. 2 and FIG. 3, the microfluidic chip in an embodiment of the present disclosure has a reagent output structure 240. The reagent output structure 240) includes a reagent storage chamber 202, a first centrifugal-force flow channel 261, and a delay unit 263. The delay unit 263 includes a first turning flow channel 2631, a capillary-force flow channel 2632, a second turning flow channel 2633, and a second centrifugal-force flow channel 2634. The first centrifugal-force flow channel 261 has a first discharge microfluidic valve 262. The second centrifugal-force flow channel 2634 has a second discharge microfluidic valve 2635. The first centrifugal-force flow channel extends away from the rotation center 11 after being led out from the reagent storage chamber 202. The first centrifugal-force flow channel is in communication with one end of the first turning flow channel 2631. Another end of the first turning flow channel 2631 is in communication with one end of the capillary-force flow channel 2632. The capillary-force flow channel 2632 extends close to the rotation center 11 after being led out from the first turning flow channel 2631. Another end of the capillary-force flow channel 2632 is in communication with one end of the second turning flow channel 2633. Another end of the second turning flow channel 2633 is in communication with the second centrifugal-force flow channel 2634. The second centrifugal-force flow channel 2634 extends away from the rotation center 11 after being led out from the second turning flow channel 2633.

The delay unit 263 in the aforementioned microfluidic chip 10 can delay the output time of the reagent from the corresponding reagent storage chamber 202 to other liquid channels. During the test, by increasing the speed of centrifugation, the reagent in the reagent storage chamber 202 breaks through a first discharge microfluidic valve 262 on the first centrifugal-force flow channel 261, and enters the first turning flow channel 2633 of the delay unit 263. At this time, since the centrifugal force is greater than the capillary force, the reagent remains within the first turning flow channel 2631. The speed of centrifugation is then decreased, at this time, the centrifugal force is less than the capillary force, the reagent within the first turning flow channel 2631 enters the capillary-force flow channel 2632, enters the second turning flow channel 2633, and reaches in front of a second discharge microfluidic valve 2635 of the second centrifugal-force flow channel 2634. The speed of centrifugation is increased, the reagent breaks through the second discharge microfluidic valve 2635 and is outputted from the second centrifugal-force flow channel 2634. As such, after several rounds of increase and decrease of the centrifugal speed, the reagent can be outputted through the delay unit 263. The aforementioned microfluidic chip 10 is suitable for reactions that need to control the reagent output time and reaction sequence, especially for reactions that need to apply multiple reagents successively, so that the application time of the multiple reagents can be controlled and multi-step reactions can be performed. Therefore, the aforementioned microfluidic chip 10 can perform relatively complex reactions, avoiding the complexity of operation during test.

In one example, the first discharge microfluidic valve 262 is a hydrophobic valve or a capillary valve.

In one example, the second discharge microfluidic valve 2635 is a hydrophobic valve or a capillary valve.

The extending directions of the first turning flow channel 2631 and the second turning flow channel 2633 are the same as or close to the rotational circumferential direction of the microfluidic chip 10. The first turning flow channel 2631 and the second turning flow channel 2633 may be in a shape of, but not limited to an arc, a straight line, etc.

In one example, the first turning flow channel 2631 is an arc-shaped channel with the rotation center 11 as the center.

In one example, the second turning flow channel 2633 is an arc-shaped channel with the rotation center 11 as the center.

Figure 4:
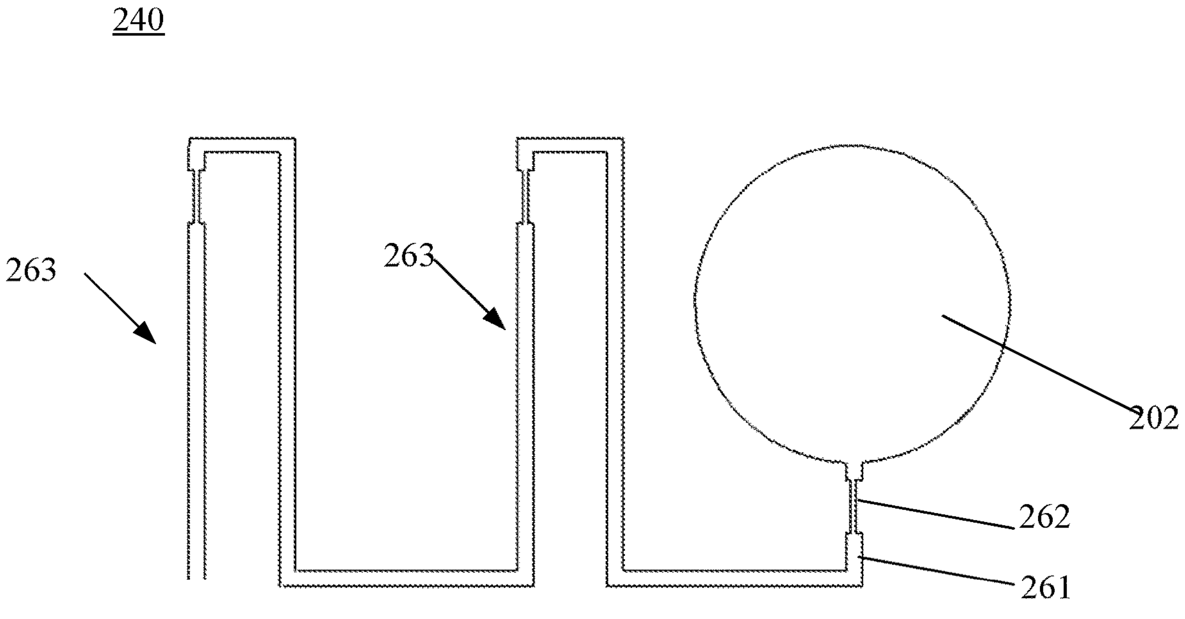
FIG. 4 is a structural schematic view of another form of the reagent output structure in the microfluidic chip shown in FIG. 1.

In one example, as shown in FIG. 4, a plurality of delay units 263 are provided. The plurality of delay units 263 are communicated successively. The first turning flow channel 2631 of a latter delay unit 263 is in communication with the second centrifugal-force flow channel 2634 of a former delay unit 263.

In one example, a plurality of reagent output structures 240 are provided. The plurality of reagent output structures 240 surround the rotation center 11 and are distributed at intervals. At least one reagent output structure 240 includes a plurality of delay units 263. The plurality of delay units 263 are communicated successively. The first turning flow channel 2631 of a latter delay unit 263 is in communication with the second centrifugal-force flow channel 2634 of a former delay unit 263. At least one reagent output structure 240 has a different number of delay units 263 as compared to other reagent output structures 240.

In one example, the number of the delay units 263 in each reagent output structure 240 is different from the number of the delay units 263 in other reagent output structures 240.

In one example, among the plurality of delay units 263 that are communicated successively, the latter delay unit 263 is farther away from the corresponding reagent storage chamber 202 than the former delay unit 263.

Figure 5:
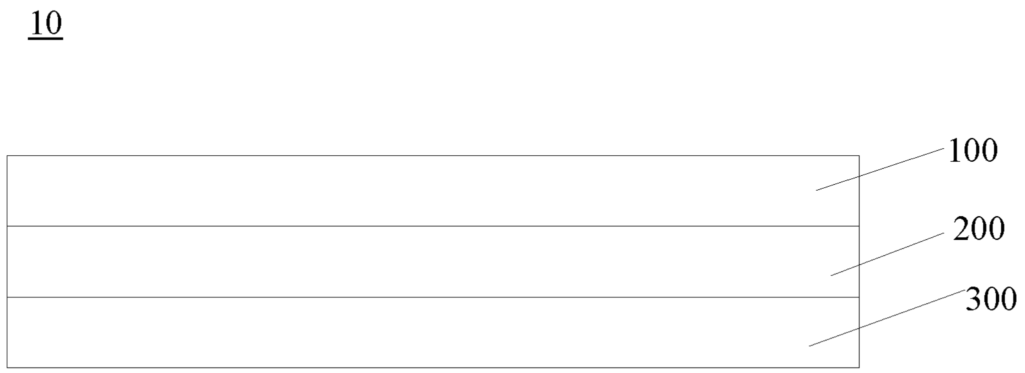
FIG. 5 is a schematic view showing the position relation between a sample and solvent addition layer, a common reagent layer and a reaction layer in the microfluidic chip shown in FIG. 1.
Figure 6:
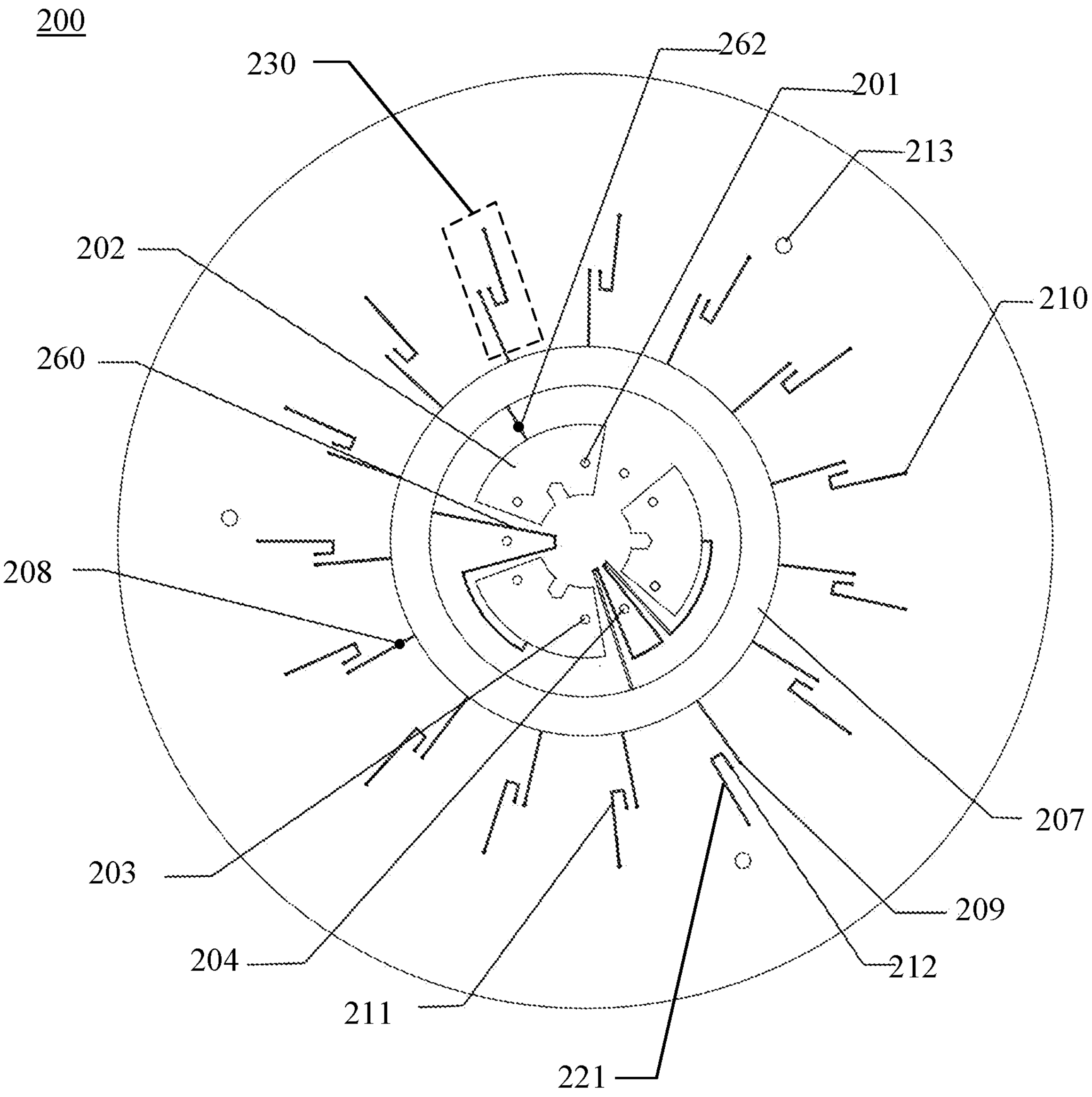
FIG. 6 is a structural schematic view of a common reagent layer in the microfluidic chip shown in FIG. 1.
Figure 7:
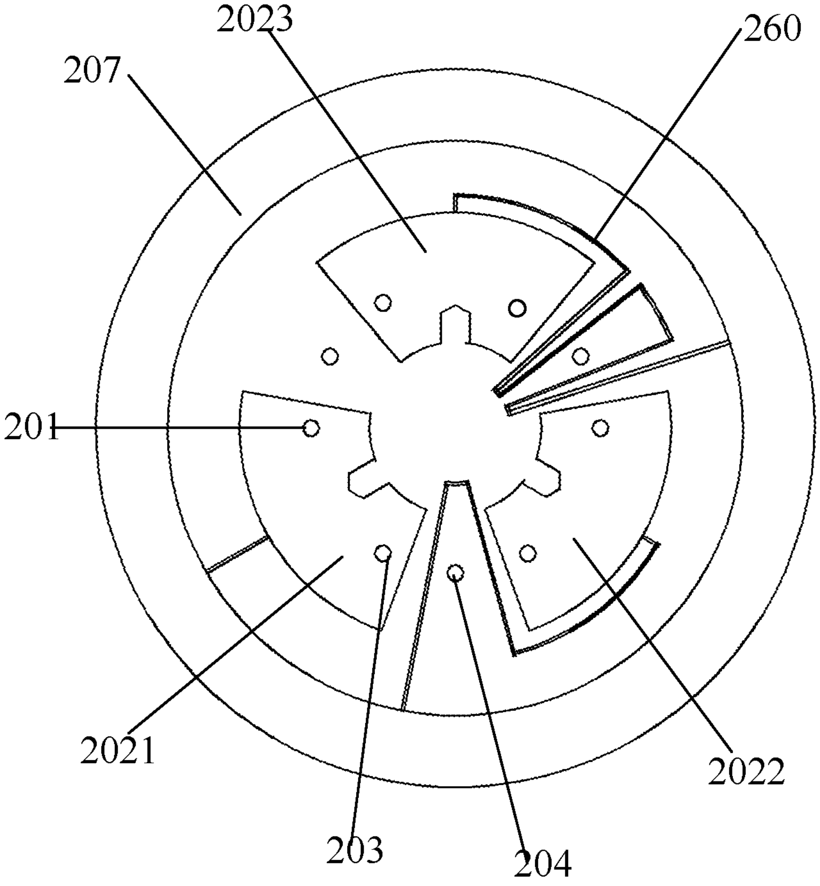
FIG. 7 is a partially enlarged view of FIG. 6.

In one example, further referring to FIG. 5 to FIG. 7, the microfluidic chip 10 includes a common reagent layer 200 and a reaction layer 300 that are laminated. The common reagent layer 200 includes the reagent output structure 240.

Figure 8:
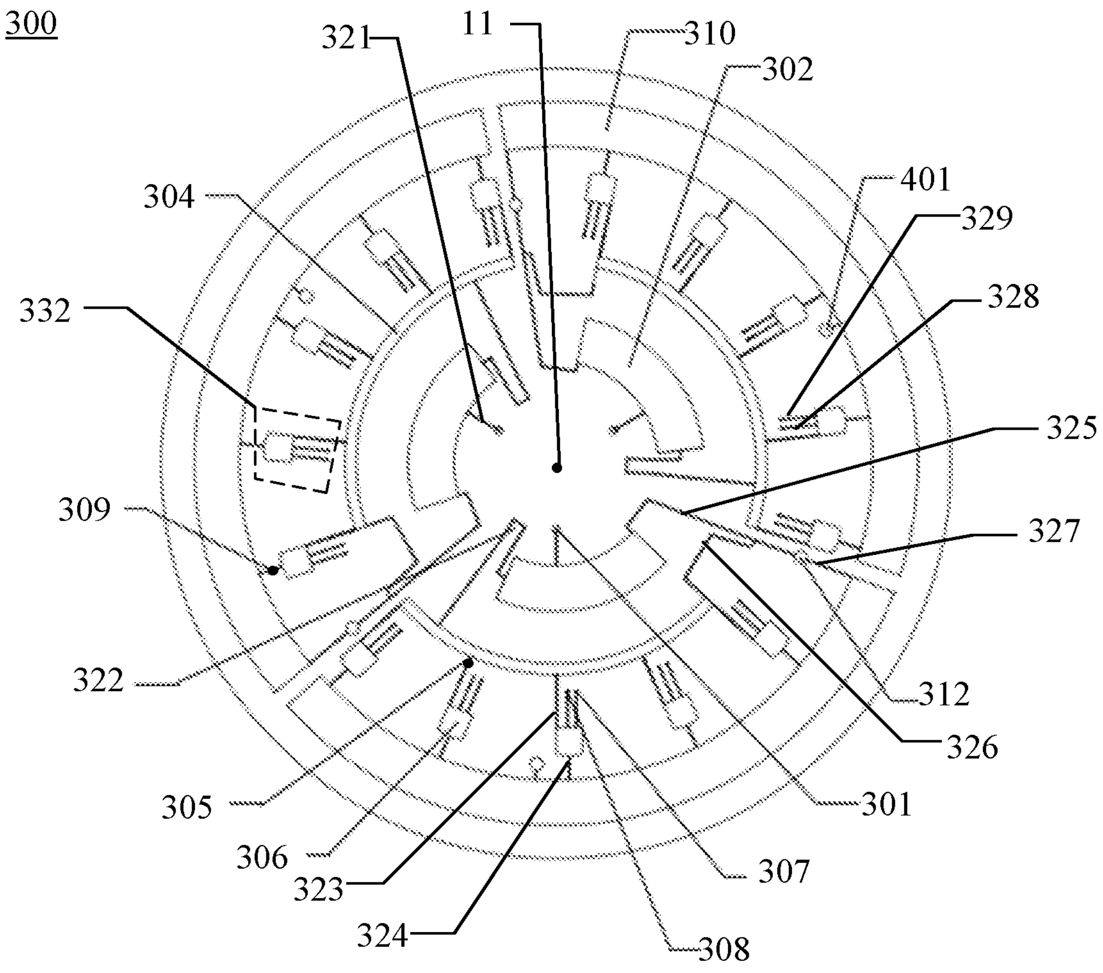
FIG. 8 is a structural schematic view of a reaction layer in the microfluidic chip shown in FIG. 1.
Figure 9:
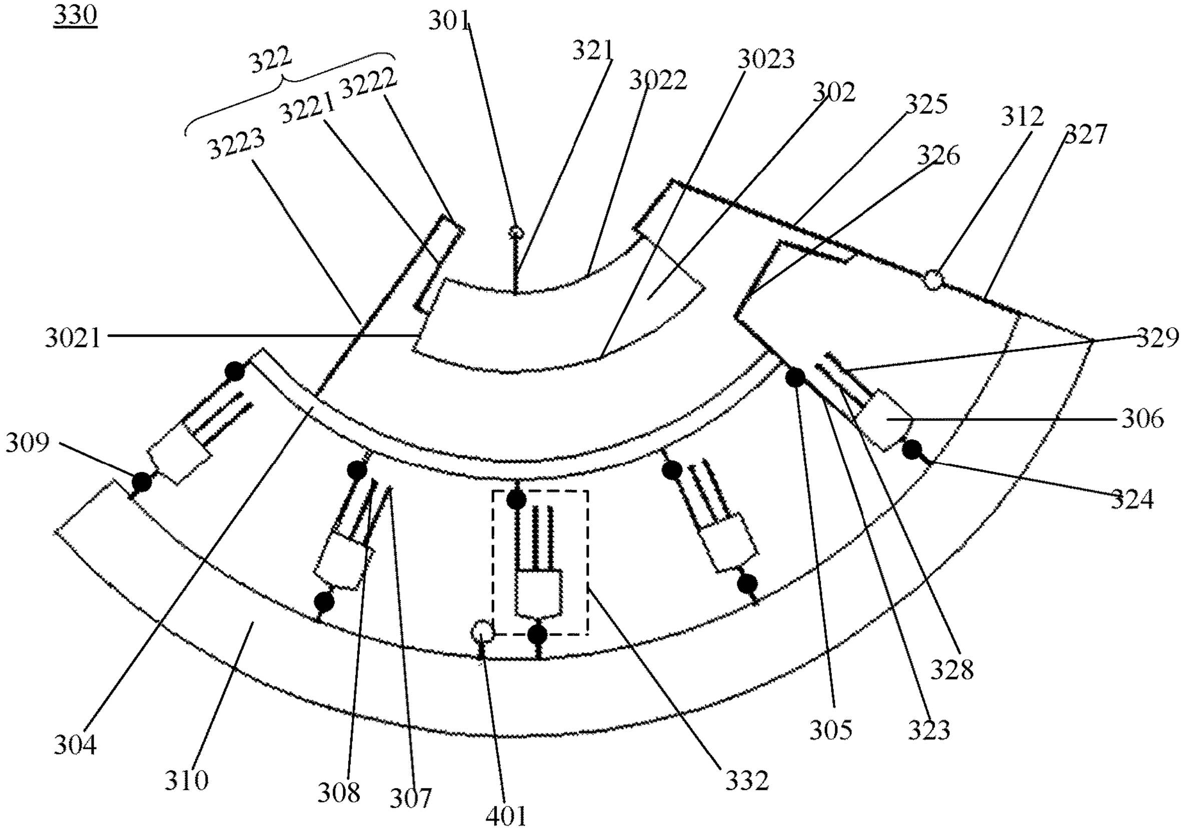
FIG. 9 is a structural schematic view of a distribution and reaction structure of a reaction layer in the microfluidic chip shown in FIG. 1.

As shown in FIG. 8 and FIG. 9, the reaction layer 300 includes a plurality of distribution and reaction structures 330. The plurality of distribution and reaction structures 330 are distributed around the rotation center 11 and arranged at intervals.

The distribution and reaction structure 330 includes a first area sample addition hole 301, a separation chamber 302, a first area second microfluidic channel 322, a first area distributing chamber 304, and a reaction unit 332. The first area sample addition hole 301 is in communication with the separation chamber 302. Specifically, the first area sample addition hole 301 is in communication with the separation chamber 302 via a first area third microfluidic channel 323. The separation chamber 302 is in communication with the first area distributing chamber 304 via the first area second microfluidic channel 322. The reaction unit 332 includes a first area first microfluidic channel 321 and a reaction chamber 306. The reaction chamber 306 is in communication with the first area distributing chamber 304 via the first area first microfluidic channel 321.

In each distribution and reaction structure 330, the first area distributing chamber 304 extends around the rotation center 11. For example, the first area distributing chamber 304 can be an arc-shaped cavity with the rotation center 11 as the center. In each distribution and reaction structure 330, a plurality of reaction units 332 are provided. The plurality of reaction units 332 are distributed along the extending direction of the first area distributing chamber 304. The distances from the separation chamber 302, the first area distributing chamber 304, and the reaction chamber 306 to the rotation center 11 gradually increase.

The aforementioned microfluidic chip 10 includes the plurality of distribution and reaction structures 330. The plurality of distribution and reaction structures 330 are arranged around the rotation center 11 and distributed at intervals. Each distribution and reaction structure 330) includes the first area sample addition hole 301, the first area distributing chamber 304 and the reaction unit 332 which are communicated successively. The reaction unit 332 includes the first area first microfluidic channel 321 and the reaction chamber 306. The reaction chamber 306 is in communication with the first area distributing chamber 304 via the first area first microfluidic channel 321. When using the aforementioned microfluidic chip 10 for detection, a blood sample can be added into the first area sample addition hole 301, the blood sample enters the first area distributing chamber 304, and reaches the plurality of reaction chambers 306 in the corresponding distribution and reaction structures 330 via the first area first microfluidic channel 321. The blood sample is mixed with the stored materials in the reaction chambers 306 for reaction. The plurality of distribution and reaction structures 330 are capable of detecting multiple samples. In each distribution and reaction structure 330, a plurality of reaction units 332 are provided. The plurality of reaction units 332 are capable of detecting multiple items. As such, multiple samples can be detected for multiple items simultaneously on the same microfluidic chip, thereby realizing combined detection on multiple samples and multiple items.

The number of the distribution and reaction structures 330 is at least two, such as three to ten. In the illustrated example, the microfluidic chip 10 has three distribution and reaction structures 330.

In each distribution and reaction structure 330, at least two, such as three to fifteen reaction units 332 may be provided. It can be understood that the number of the reaction unit 332 in different distribution and reaction structures 330 may be the same or different. In the illustrated example, five reaction units 332 are provided in each distribution and reaction structure 330.

In one example, the distribution and reaction structure 330 further includes a separation chamber 302 and a first area second microfluidic channel 322. The separation chamber 302 is in communication with the first area distributing chamber 304 via the first area second microfluidic channel 322. The separation chamber 302 is closer to the rotation center 11 than the first area distributing chamber 304. When the whole blood sample passes through the separation chamber 302, the plasma can be separated and enter the first area distributing chamber 304.

In one example, the distribution and reaction structure 330 further includes a first area fourth microfluidic channel 324 and a waste liquid storage chamber 310. The reaction chamber 306 is in communication with the waste liquid storage chamber 310 via the first area fourth microfluidic channel 324. The waste liquid storage chamber 310 is farther away from the rotation center 11 than the reaction chamber 306.

In one example, the first area fourth microfluidic channel 324 is provided with a first area second microfluidic valve 309. The first area second microfluidic valve 309 can be a hydrophobic valve, a capillary valve, or the like.

In one example, the microfluidic chip 10 further includes a first vent hole 401. One end of the first vent hole 401 is in communication with the waste liquid storage chamber 310, and another end of the first vent hole 401 is opened on one side surface of the microfluidic chip 10.

In one example, the first area first microfluidic channel 321 is provided with a first area first microfluidic valve 305. The first area first microfluidic valve 305 can be a hydrophobic valve, a capillary valve, or the like.

In one example, the first area second microfluidic channel 322 is a U-shaped microfluidic channel. The opening of the first area second microfluidic channel 322 is away from the rotation center 11. More specifically, the first area second microfluidic channel 322 includes a first sub-flow channel 3221, a second sub-flow channel 3222, and a third sub-flow channel 3223 which are sequentially communicated. The first sub-flow channel 3221 extends close to the rotation center 11 after being led out from the separation chamber 302. The first sub-flow channel 3221 is in communication with one end of the second sub-flow channel 3222. Another end of the second sub-flow channel 3222 is in communication with the third sub-flow channel 3223. The third sub-flow channel 3223 extends away from the rotation center 11 after being led out from the second sub-flow channel 3222 and is in communication with the first area distributing chamber 304. More specifically, the first sub-flow channel 3221 is in communication with one side surface of the separation chamber 302. The side surface of the separation chamber 302 is a surface connecting a side surface of the separation chamber 302 close to the rotation center 11 and a side surface of the separation chamber 302 far away from the rotation center 11. For example, in the illustrated specific example, the separation chamber 302 is an annular sector cavity extending along the rotational circumferential direction of the microfluidic chip 10. The first sub-flow channel 3221 is in communication with one side plane of the separation chamber 302. The side plane of the separation chamber 302 is a surface connecting an arc surface of the separation chamber 302 close to the rotation center 11 and an arc surface of the separation chamber 302 away from the rotation center 11.

The separation chamber 302 has a relatively wide width in the radial direction of the microfluidic chip 10, which is beneficial to improving the degree of separation of samples.

In one example, in each distribution and reaction structure 330, the separation chamber 302 is in communication with the waste liquid storage chamber 310 via the first area fifth microfluidic channel 325. The excess liquid in the separation chamber 302 can be discharged into the waste liquid storage chamber 310 via the first area fifth microfluidic channel 325. Further, the first area fifth microfluidic channel 325 is a U-shaped microfluidic channel. The opening of the first area fifth microfluidic channel 325 is away from the rotation center 11. In one example, the first area fifth microfluidic channel 325 is led out from the side surface of the separation chamber 302 close to the rotation center 11, which facilitates to discharge the separated waste into the waste liquid storage chamber 310. In one example, the first area fifth microfluidic channel 325 is led out from one end of the side surface of the separation chamber 302 close to the rotation center 11, which facilitates to discharge the separated waste into the waste liquid storage chamber 310. In the illustrated specific example, the locations where the first area second microfluidic channel 322 and the first area fifth microfluidic channel 325 connect to the separation chamber 302 are respectively located on the opposite ends of the separation chamber 302.

In the radial direction of the microfluidic chip 10, the width of the first area distributing chamber 304 is narrower than the width of the separation chamber 302, which facilitates to make the separated plasma sample to fill the separation chamber 302 and increase the uniformity of the amount of sample delivered from the first area distributing chamber 304 to the plurality of reaction chambers 306.

In one example, the first area distributing chamber 304 extends along the rotational circumferential direction of the microfluidic chip 10. In one example, the width the first area distributing chamber 304 in the radial direction of remains consistent in the extending direction.

In one example, in each distribution and reaction structure 330, the first area distributing chamber 304 is in communication with the waste liquid storage chamber 310 via the first area sixth microfluidic channel 326. The excess liquid in the first area distributing chamber 304 can be discharged into the waste liquid storage chamber 310 via the first area sixth microfluidic channel 326. Furthermore, the first area sixth microfluidic channel 326 is a U-shaped microfluidic channel. The opening of the first area sixth microfluidic channel 326 is away from the rotation center 11. In one example, the first area sixth microfluidic channel 326 is led out from the side surface of the first area distributing chamber 304 close to the rotation center 11. In another example, the first area sixth microfluidic channel 326 is led out from one end of the side surface of the first area distributing chamber 304 close to the rotation center 11, which facilitates to discharge the excess liquid into the waste liquid storage chamber 310.

In the illustrated and specific example, the first area fifth microfluidic channel 325 and the first area sixth microfluidic channel 326 converge and are in communication with one end of the first area seventh microfluidic channel 327. Another end of the first area seventh microfluidic channel 327 is in communication with the waste liquid storage chamber 310. The first area seventh microfluidic channel 327 is provided with a backflow prevention valve 312. The backflow prevention valve 312 can prevent the waste liquid in the waste liquid storage chamber 310 from flowing back.

In one example, in the distribution and reaction structure 330, the plurality of reaction units 332 are uniformly distributed along the extending direction of the first area distributing chamber 304.

In one example, the reaction unit 332 further includes a first area first reagent inlet port 308 and a first area eighth microfluidic channel 328. The first area first reagent inlet port 308 is in communication with the reaction chamber 306 via the first area eighth microfluidic channel 328. The first area first reagent inlet port 308 is closer to the rotation center 11 than the reaction chamber 306.

In the aforementioned examples, a desired reagent can be added to the reaction chamber 306 via the first area first reagent inlet port 308.

The common reagent layer 200 further includes a second area sample addition hole 204, a second area solvent addition hole 201, a second area distributing chamber 207, and a liquid distribution unit 230. The second area solvent addition hole 201 is in communication with the reagent storage chamber 202. The reagent storage chamber 202 is in communication with the second area distributing chamber 207. The second area distributing chamber 207 is arranged around the rotation center 11. The liquid distribution unit 230 includes a second area first microfluidic channel 221 and a second area first connecting port 209. The second area first connecting port 209 is in communication with the second area distributing chamber 207 via the second area first microfluidic channel 221. A plurality of liquid distribution units 230 are provided. The plurality of liquid distribution units 230 are distributed along the extending direction of the second area distributing chamber 207. The distances from the reagent storage chamber 202, the second area distributing chamber 207, and the liquid distribution unit 230 to the rotation center gradually increase.

The plurality of liquid distribution units 230 are in one-to-one correspondence with the plurality of reaction units 332 in the reaction layer 300. The second area first connecting port 209 is in communication with the first area first reagent inlet port 308 via a fifth interlayer channel (not shown). The second area sample addition hole 204 is in communication with the first area sample addition hole 301 via a sixth interlayer channel (not shown).

In the aforementioned example, the sample liquid is added from the second area sample addition hole 204, the sample liquid enters the first area sample addition hole 301 in the reaction layer 300 via the sixth interlayer channel, and enters the separation chamber 302. The reagent storage chamber 202 can store required reagents. Under the centrifugation, the reagent stored in the reagent storage chamber 202 enters the second area distributing chamber 207, reaches the second area first connecting port 209 via the second area first microfluidic channel 221, reaches the first area first reagent inlet port 308 in the reaction layer 300 via the fifth interlayer channel, and enters the reaction chamber 306 via an first area eighth microfluidic channel 328.

In one example, the second area first microfluidic channel 221 has a second area first microfluidic valve 208.

In one example, as shown in FIG. 9, the reaction unit 332 further includes a first area second reagent inlet port 307 and a first area ninth microfluidic channel 329. The first area second reagent inlet port 307 is in communication with the reaction chamber 306 via the first area ninth microfluidic channel 329. The first area second reagent inlet port 307 is closer to the rotation center 11 than the reaction chamber 306.

In the aforementioned examples, a desired reagent can be added to the reaction chamber 306 via the first area second reagent inlet port 307.

In one example, the second area distributing chamber 207 is in the shape of a ring with the microfluidic chip 10 as the center.

In one example, a first reagent is stored in the reagent storage chamber 202.

Optionally, the first reagent can be a single reagent or a combination of several kinds of reagents. The first reagent stored in the reagent storage chamber 202 can be a fluid reagent or a freeze-dried reagent.

The freeze-dried reagent can be obtained by performing freeze-drying treatment to the first reagent in the fluid form stored in the reagent storage chamber 202.

The freeze-drying treatment refers to a drying method including freezing the wet material below the freezing point (i.e., eutectic point), then sublimating under an appropriate vacuum condition to remove ice crystals, and resolution drying to remove a portion of the bound water. The freeze-dried product has advantages, such as low decomposition rate and high purity due to drying under low temperature and vacuum conditions: basically maintaining the volume of the frozen original solution, loose and porous, beautiful appearance, and uniform color: easy to be dissolved in water and immediately restoring original properties of drugs: less contaminant and less foreign material, with improved solubility of drugs and increased clarity of preparations: with a moisture content less than 8%, ensuring a long-time storage and convenient for transportation.

Figure 10:
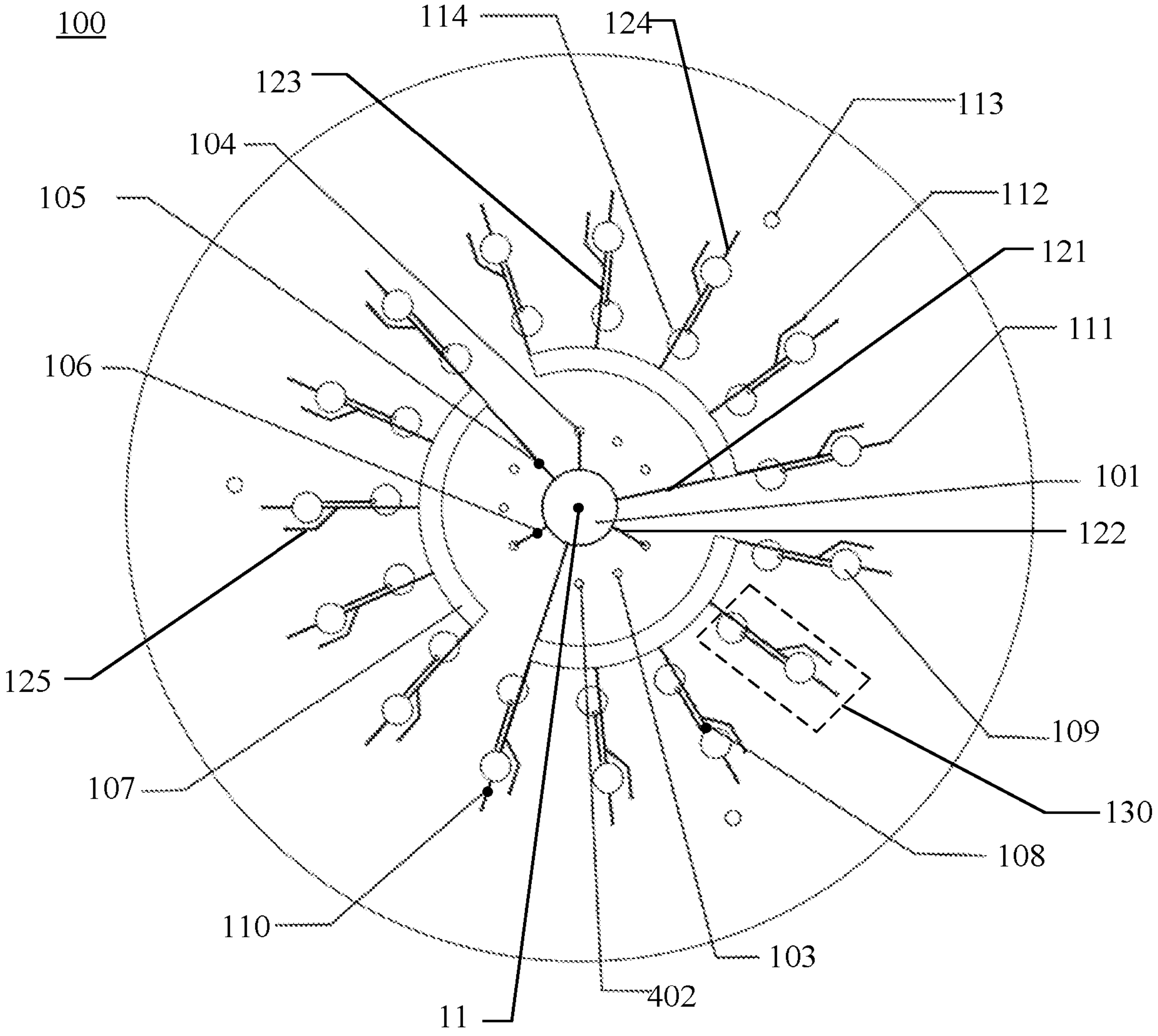
FIG. 10 is a structural schematic view of a sample and solvent addition layer in the microfluidic chip shown in FIG. 1.

In one example, further in combination with FIG. 10, the microfluidic chip 10 further includes a sample and solvent addition layer 100. The sample and solvent addition layer 100, the common reagent layer 200 and the reaction layer 300 are laminated in sequence. The sample and solvent addition layer 100 can be used to add the desired material to the reaction layer 300, such as chemical substance-labeled antibodies.

The sample and solvent addition layer 100 includes a third area sample addition hole 103, a third area solvent addition hole 101, a third area first microfluidic channel 121, a third area distributing chamber 107, a third area second microfluidic channel 122, a third area first connecting port 104, and a storage unit 130. The third area distributing chamber 107 is disposed to surround the rotation center 11. The third area solvent addition hole 101 is in communication with the third area distributing chamber 107 via the third area first microfluidic channel 121. The third area solvent addition hole 101 is in communication with the third area first connecting port 104 via the third area second microfluidic channel 122.

The storage unit 130 includes a third area third microfluidic channel 123, a third area material storage chamber 109, a third area fourth microfluidic channel 124, and a third area second connecting port 111. The third area material storage chamber 109 is in communication with the third area distributing chamber 107 via a third microfluidic channel. The third area material storage chamber 109 is in communication with the third area second connecting port 111 via the third area fourth microfluidic channel 124. A plurality of storage units 130 are provided. The plurality of storage units 130 are distributed along the extending direction of the third area distributing chamber 107.

The distances from the third area solvent addition hole 101, the third area distributing chamber 107, the third area material storage chamber 109, and the third area second connecting port 111 to the rotation center 11 gradually increase. The third area first connecting port 104 is farther away from the rotation center 11 than the third area solvent addition hole 101.

In the common reagent layer 200, the liquid distribution unit 230 further includes a second area second connecting port 210, a second area second microfluidic channel 211, and a second area third connecting port 212. The second area second connecting port 210 is in communication with the second area third connecting port 212 via the second area second microfluidic channel 211. The second area second connecting port 210 is farther away from the rotation center 11 than the second area third connecting port 212.

The plurality of storage units 130 in the sample and solvent addition layer 100 are in one-to-one correspondence with the plurality of liquid distribution units 230 in the common reagent layer 200. The third area sample addition hole 103 is in communication with the sample addition hole 204 via a first interlayer channel (not shown). The third area first connecting port 104 is in communication with the second area solvent addition hole 201 via a second interlayer channel (not shown). The third area second connecting port

111 is in communication with the second area second connecting port 210 via a third interlayer channel (not shown). The second area third connecting port 212 is in communication with the first area second reagent inlet port 307 via a fourth interlayer channel (not shown).

In the example described above, the sample liquid is added from the third area sample addition hole 103, reaches the sample addition hole 204 in the common reagent layer 200 via the first interlayer channel, enters the first area sample addition hole 301 in the reaction layer 300 via a sixth interlayer channel, and then reaches the separation chamber 302. In one example, the solvent is added from the third area solvent addition hole 101, enters the third area distributing chamber 107 via the third area first microfluidic channel 121, then enters the third area material storage chamber 109 via the third microfluidic channel, reaches the third area second connecting port 111 via a third area fourth microfluidic channel 124, then reaches the second area second connecting port 210 in the common reagent layer 200 via the third interlayer channel, then reaches the second area third connecting port 212 via the second area second microfluidic channel 211, reaches the first area second reagent inlet port 307 in the reaction layer 300 via the fourth interlayer channel, and finally enters the reaction chamber 306 via a first area ninth microfluidic channel 329, so as to provide the solvent to the material stored in the reaction chamber 306. In another example, the solvent reaches the third area first connecting port 104 via the third area second microfluidic channel 122, passes through the second area solvent addition hole 201 via the second interlayer channel, and enters the reagent storage chamber 202, so as to provide the solvent to the material stored in the reagent storage chamber 202.

In one example, the microfluidic chip 10 further has a second vent hole 402. One 30) end of the second vent hole 402 is in communication with the reagent storage chamber 202, and another end of the second vent hole 402 is opened on one side surface of the microfluidic chip 10. More specifically, the reagent storage chamber 202 has a connecting port 203. The second vent hole 402 is in communication with the reagent storage chamber 202 via the connecting port 203. The second vent hole 402 can be used to add a reagent to the reagent storage chamber 202. During the test, the second vent hole 402 also functions as a vent.

In one example, the second area second microfluidic channel 211 a U-shaped microfluidic channel. The opening of the second area second microfluidic channel 211 is away from the rotation center 11.

In one example, the third area first microfluidic channel 121 is provided with a third area first microfluidic valve 105.

In one example, the third area second microfluidic channel 122 is provided with a third area second microfluidic valve 106.

In one example, the third area third microfluidic channel 123 is provided with a third area third microfluidic valve 108.

In one example, the third area fourth microfluidic channel 124 is provided with a third area fourth microfluidic valve 110.

In one example, the storage unit 130 further includes a fifth microfluidic channel and a third vent hole 112. One end of the fifth microfluidic channel is in communication with the third area third microfluidic channel 123, and another end of the fifth microfluidic channel is in communication with a third vent hole 112. The third vent hole 112 is opened on one side surface of the microfluidic chip 10.

In one example, as shown in FIG. 10, the third area distributing chamber 107 includes a plurality of distributing sub-chambers. The plurality of distributing sub-chambers are distributed around the rotation center 11 and arranged at intervals. Each distributing sub-chamber is in communication with the plurality of storage units 130. In the illustrated and specific example, the third area distributing chamber 107 is divided into three distributing sub-chambers, and each distributing sub-chamber is in communication with the five storage units 130.

Figure 11:
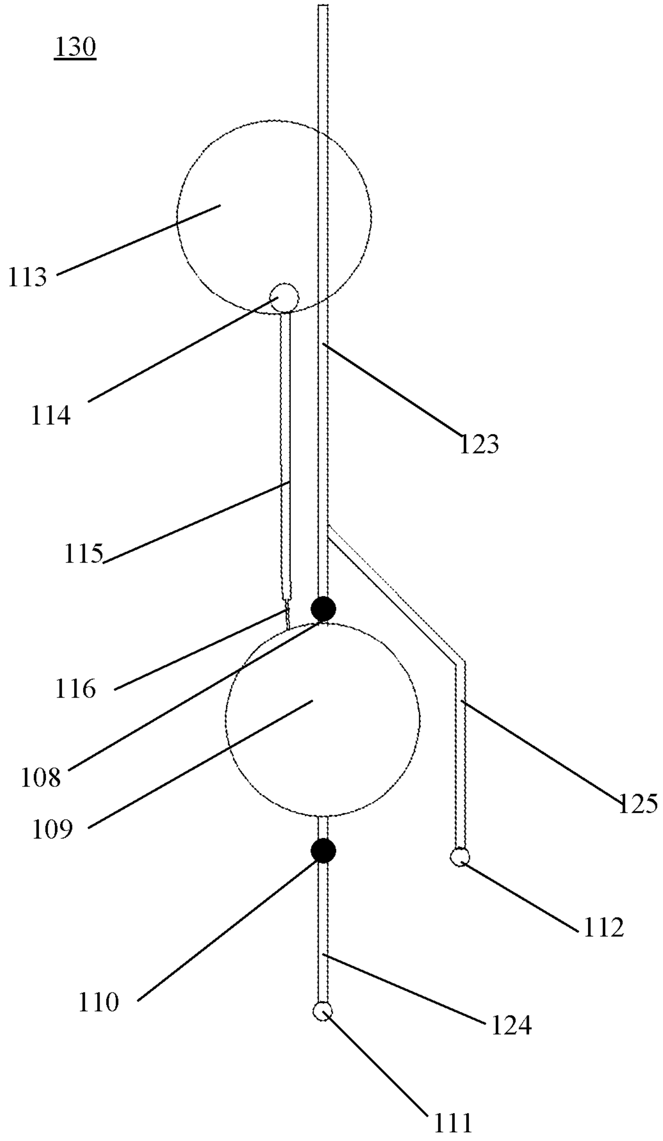
FIG. 11 is a structural schematic view of a storage unit.
Figure 12:
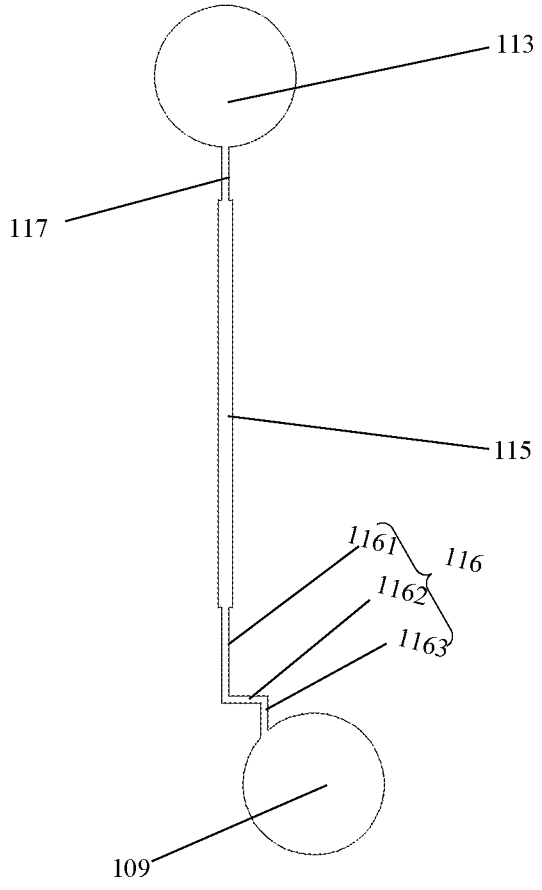
FIG. 12 is a schematic view of a partial structure of a storage unit.
Figure 13:
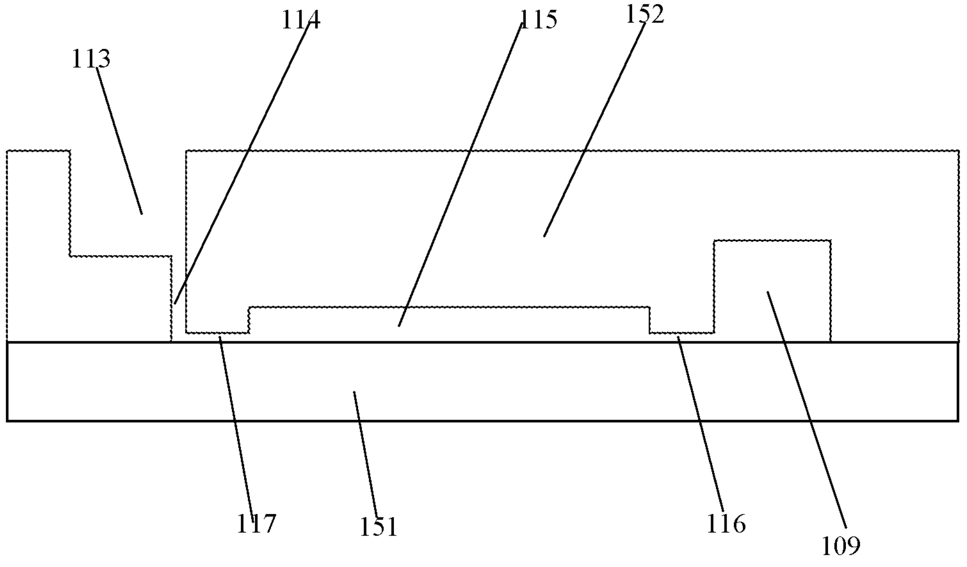
FIG. 13 is a cross-sectional view of a sample and solvent addition layer at a partial position shown in FIG. 12.

In one example, as shown in FIG. 11 to FIG. 13, the storage unit 130 further includes a reagent adding groove 113, a feed permeation hole 114, a feed microfluidic channel 115, and a first feed microfluidic valve 116. The reagent adding groove 113 is opened on one side surface of the microfluidic chip 10. The reagent adding groove 113 is in communication with the feed microfluidic channel 115 via the feed permeation hole 114. The feed microfluidic channel 115 is in communication with the third area material storage chamber 109 via the first feed microfluidic valve 116. The third area material storage chamber 109 is farther away from the rotation center 11 than the reagent injection port.

The aforementioned microfluidic chip 10 in the examples has a reagent storage function and can store reagents in advance before the test. When the reagent is stored in advance, the reagent to be stored is added to the reagent adding groove 113, and enters the feed microfluidic channel 115 via the feed permeation hole 114. Through rotation and centrifugation, the reagent to be stored breaks through the first feed microfluidic valve 116 and enters the third area material storage chamber 109. The first feed microfluidic valve 116 can prevent the reagent from flowing back from the third area material storage chamber 109, thereby realizing the storage of the reagent. The aforementioned microfluidic chip 10 enables the encapsulation of the reagents required for detection in the microfluidic chip 10 through structural design. It can be understood that the third area material storage chamber 109 can be in communication with a liquid channel for detection. When the detection is required, the reagent is driven to enter the liquid channel for detection by increasing the centrifugal force. The aforementioned microfluidic chip 10 has the integrated reagents and chip to detect microfluidic items, thereby avoiding the reagent addition operation in the test process, which is convenient to use and saves time.

In one example, the end of the feed permeation hole 114 which is in communication with the reagent adding groove 113 is opened on the bottom of the reagent adding groove 113, which facilitates the reagent to effectively enter the feed permeation hole 114.

In one example, the feed permeation hole 114 extends perpendicular to the surface of the microfluidic chip 10, which facilitates the reagent to effectively enter the feed microfluidic channel 115.

In one example, the end of the first feed microfluidic valve 116 which is in communication with the third area material storage chamber 109 is opened on the side wall of the third area material storage chamber 109. As such, through rotation under centrifugation, the reagent can effectively enter the third area material storage chamber 109.

In one example, the first feed microfluidic valve 116 is a hydrophobic valve or a capillary valve.

In one example, as shown in FIG. 12, the reagent storage structure further includes a second feed microfluidic valve 117. The feed permeation hole 114 is in communication with the feed microfluidic channel 115 via the second feed microfluidic valve 117.

In the aforementioned example, the second feed microfluidic valve 117 is provided between the feed permeation hole 114 and the feed microfluidic channel 115, when the reagent is added dropwise, the reagent initially remains in the reagent adding groove 113. After rotation and centrifugation, the reagent enters the feed microfluidic channel 115 at the same time, thereby reducing the difference. On the other hand, the reagent is prevented from backflow in subsequent drying process, which is equivalent to make another protection measure.

In one example, as shown in FIG. 12, the first feed microfluidic valve 116 includes a first segment 1161, a second segment 1162, and a third segment 1163 that are communicated successively: One end of the first segment 1161 is in communication with the feed microfluidic channel 115. One end of the third segment 1163 is in communication with the third area material storage chamber 109. The first segment 1161 and the third segment 1163 extend away from the rotation center 11. The third segment 1163 is farther away from the rotation center 11 than the first segment 1161. The first segment 1161 and the third segment 1163 form an angle with the second segment 1162, respectively. For example, the first segment 1161 and the third segment 1163 are respectively perpendicular to the second segment 1162. As such, the feed microfluidic channel 115 deviates from the third area material storage chamber 109 to stagger with other liquid channels which are communicated with the third area material storage chamber 109. Moreover, the backflow of reagent from the third area material storage chamber 109 can be better avoided.

In one example, as shown in FIG. 13, the sample and solvent addition layer 100 includes a base plate 151 and a cover plate 152. The cover plate 152 is provided with a groove structure. The base plate 151 is connected to the cover plate 152 to allow the groove structure to form a cavity structure.

In one example, a second reagent is stored in the third area material storage chamber 109. The second reagent can be, but not limited to, a chemical substance-labeled antibody, such as an acridine-labeled antibody. The second reagent can be a fluid reagent or a freeze-dried reagent. The freeze-dried reagent can be obtained by performing freeze-drying treatment to the second reagent in the fluid form stored in the third area material storage chamber 109.

Conventional chips often need to add reagents from the outside, leading to installation of bloated and huge supporting devices, making it difficult to meet the detection demand for multiple samples and multiple items, and cannot realizing the integration of reagents into the chip to orderly release reagents. However, the microfluidic chip 10 in the above examples does not need to add common reagents from the outside during the experiment, and can automatically and orderly release reagents, thereby reducing the number of supporting devices, which facilitates the detection on multiple samples and multiple items.

It can be understood that if there is no need to add a second reagent, the sample and solvent addition layer 100 can be omitted.

In one example, a third reagent is stored in the reaction chamber 306.

In one example, magnetic beads labeled with immune components are stored in the reaction chamber 306. The immune components are antigens or antibodies, which can be freeze-dried. For example, freeze-dried magnetic beads coated with CTNI/NT-pro BNP/D-dimer/MYO/CKMB are stored in the reaction chamber 306. The magnetic beads can be fixed by the magnetic force, so that they remain in the reaction chamber 306 to be prevented from being thrown into the waste liquid storage chamber 310. In one example, the reaction layer 300 includes a base plate and a groove plate. The groove plate is connected to the common reagent layer 200. The base plate and the groove plate are connected to form a cavity structure in the reaction layer 300. During the manufacture, the antigen-coated magnetic beads can be fixed on the base plate by dispensing a glue, and the rest part including the base plate is connected to the groove plate.

The corresponding chemical substance-labeled antibody is stored in the third area material storage chamber 109, which can be freeze-dried, such as freeze-dried acridine-labeled CTNI/NT-pro BNP/D-dimer/MYO/CKMB antibody. The chemical substance-labeled antibodies enter the reaction chamber 306 and incubate with the antigens on the magnetic beads for reaction to form antibody-antigen-labeled antibody structures.

The cleaning agent can contain a surfactant, which can wash away unbound antibodies and discharge them into the waste liquid storage chamber 310. NaOH can be used as a pre-excitation solution. hydrogen peroxide can be used as an excitation solution. The acridinium ester labeled on the labeled antibody can emit light in a system containing the pre-excitation solution and the excitation solution, and the light signal can be detected.

In one example, the sample and solvent addition layer 100, the common reagent layer 200, and the reaction layer 300 are integrally connected. In other examples, the sample and solvent addition layer 100, the common reagent layer 200, and the reaction layer 300 can be manufactured independently and then docked.

The present disclosure will be further described in the below by taking the detection method using the illustrated specific microfluidic chip 10 as an example.

The microfluidic chip 10 in a specific example of the present disclosure includes a sample and solvent addition layer 100, a common reagent layer 200, and a reaction layer 300 that are laminated in sequence.

The microfluidic chip 10 includes the sample and solvent addition layer 100, the common reagent layer 200 and the reaction layer 300 that are laminated in sequence.

Sample and Solvent Addition Layer 100

The sample and solvent addition layer 100 includes a third area sample addition hole 103, a third area solvent addition hole 101, a third area first microfluidic channel 121, a third area distributing chamber 107, a third area second microfluidic channel 122, a third area first connecting port 104, and a reagent storage structure 130. The third area distributing chamber 107 is arranged around the rotation center 11. The third area solvent addition hole 101 is in communication with the third area distributing chamber 107 via the third area first microfluidic channel 121. The third area first microfluidic channel 121 is provided with a third area first microfluidic valve 105. The third area solvent addition hole 101 is in communication with the third area first connecting port 104 via a third area second microfluidic channel 122. The third area second microfluidic channel 122 is provided with a third area second microfluidic valve 106.

The reagent storage structure 130 includes a third area third microfluidic channel 123, a third area material storage chamber 109, a third area fourth microfluidic channel 124, a third area second connecting port 111, a third area fifth microfluidic channel 125, and a third vent hole 112. The third area material storage chamber 109 is in communication with the third area distributing chamber 107 via a third microfluidic channel. The third area third microfluidic channel 123 is provided with a third area third microfluidic valve 108. The third area material storage chamber 109 is in communication with the third area second connecting port 111 via a third area fourth microfluidic channel 124. The third area fourth microfluidic channel 124 is provided with a third area fourth microfluidic valve 110.

One end of the third area fifth microfluidic channel 125 is in communication with the third area third microfluidic channel 123, and another end of the third area fifth microfluidic channel 125 is in communication with the third vent hole 112. The third vent hole 112 is opened on one side surface of the microfluidic chip 10.

A plurality of reagent storage structures 130 are provided. The plurality of reagent storage structures 130 are distributed along the extending direction of the third area distributing 30) chamber 107. The third area distributing chamber 107 includes a plurality of sub-distributing chambers. The plurality of sub-distributing chambers are distributed around the rotation center 11 and arranged at intervals. Each sub-distributing chamber is in communication with the plurality of reagent storage structures 130.

The distances from the third area solvent addition hole 101, the third area distributing chamber 107, the third area material storage chamber 109, and the third area second connecting port 111 to the rotation center 11 gradually increase. The third area first connecting port 104 is farther away from the rotation center 11 than the third area solvent addition hole 101.

The reagent storage structure 130 further includes a reagent adding groove 113, a feed permeation hole 114, a feed microfluidic channel 115, a first feed microfluidic valve 116, and a second feed microfluidic valve 117. The reagent adding groove 113 is opened on one side surface of the microfluidic chip 10. The reagent adding groove 113 is in communication with the feed microfluidic channel 115 via the feed permeation hole 114. The feed microfluidic channel 115 is in communication with the third area material storage chamber 109 via the first feed microfluidic valve 116. The third area material storage chamber 109 is farther away from the rotation center 11 than the reagent injection port. The feed permeation hole 114 is in communication with the feed microfluidic channel 115 via the second feed microfluidic valve 117.

The end of the feed permeation hole 114 which communicates to the reagent adding groove 113 is opened on the bottom of the reagent adding groove 113. The feed permeation hole 114 extends perpendicular to the surface of the microfluidic chip 10. The end of the first feed microfluidic valve 116 which communicates to the third area material storage chamber 109 is opened on the side wall of the third area material storage chamber 109.

The first feed microfluidic valve 116 includes a first segment 1161, a second segment 1162 and a third segment 1163 that are communicated successively. One end of the first segment 1161 is in communication with the feed microfluidic channel 115. One end of the third segment 1163 is in communication with the third area material storage chamber 109. The first segment 1161 and the third segment 1163 extend away from the rotation center 11. The third segment 1163 is farther away from the rotation center 11 than the first segment 1161. The first segment 1161 and the third segment 1163 are respectively perpendicular to the second segment 1162.

Freeze-dried acridine-labeled CTNI/NT-pro BNP/D-dimer/MYO/CKMB antibody is stored in the third area material storage chamber 109.

Common Reagent Layer 200

The common reagent layer 200 includes a second area sample addition hole 204, a reagent storage chamber 202, a second area solvent addition hole 201, reagent output channel 260, a second area distributing chamber 207, and a liquid distribution unit 230. The second area solvent addition hole 201 is in communication with the reagent storage chamber 202. The reagent storage chamber 202 is in communication with the second area distributing chamber 207 via the reagent output channel 260. The second area distributing chamber 207 is arranged around the rotation center 11.

The liquid distribution unit 230 includes a second area first microfluidic channel 221, a second area first connecting port 209, a second area second connecting port 210, a second area second microfluidic channel 211, and a second area third connecting port 212. The second area first connecting port 209 is in communication with the second area distributing chamber 207 via the second area first microfluidic channel 221. The second area first microfluidic channel 221 has a second area first microfluidic valve 208. The second area second connecting port 210 is in communication with the second area third connecting port 212 via the second area second microfluidic channel 211. The second area second microfluidic channel 211 a U-shaped microfluidic channel. The opening of the second area second microfluidic channel 211 is away from the rotation center 11. The second area second connecting port 210 is farther away from the rotation center 11 than the second area third connecting port 212.

A plurality of liquid distribution units 230 are provided. The plurality of liquid distribution units 230 are distributed along the extending direction of the second area distributing chamber 207. The distances from the reagent storage chamber 202, the second area distributing chamber 207, and the liquid distribution unit 230 to the rotation center 11 gradually increase.

The reagent storage chamber 202 includes a first storage sub-chamber 2021, a second storage sub-chamber 2022, and a third storage sub-chamber 2023. The plurality of storage sub-chambers are distributed around the rotation center 11 and arranged at intervals. Each storage sub-chamber is in communication with the second area distributing chamber 207.

The plurality of storage sub-chambers respectively are in communication with the second area distributing chamber 207 via a reagent output channel 260. The reagent output channel 260 includes a first centrifugal-force flow channel 261. The first centrifugal-force flow channel 261 extends away from the rotation center 11 after being led out from the reagent storage chamber 202. The first centrifugal-force flow channel 261 includes a first discharge microfluidic valve 262.

The reagent output channel 260 further includes a delay unit 263. The delay unit 263 includes a first turning flow channel 2631, a capillary-force flow channel 2632, a second turning flow channel 2633, and a second centrifugal-force flow channel 2634. The first centrifugal-force flow channel 261 extends away from the rotation center 11 after being led out from the reagent storage chamber 202. The first centrifugal-force flow channel 261 is in communication with one end of the first turning flow channel 2631. Another end of the first turning flow channel 2631 is in communication with one end of the capillary-force flow channel 2632. The capillary-force flow channel 2632 extends close to the rotation center 11 after being led out from the first turning flow channel 2631. Another end of the capillary-force flow channel 2632 is in communication with one end of the second turning flow channel 2633. Another end of the second turning flow channel 2633 is in communication with the second centrifugal-force flow channel 2634. The second centrifugal-force flow channel 2634 extends away from the rotation center 11 after being led out from the second turning flow channel 2633. The second centrifugal-force flow channel 2634 is provided with a second discharge microfluidic valve 2635.

The number of the delay unit 263 in the reagent output channel 260 corresponding to the first storage sub-chamber 2021 is zero. The number of the delay unit 263 in the reagent output channel 260 corresponding to the second storage sub-chamber 2022 is one. The number of the delay units 263 in the reagent output channel 260 corresponding to the three storage sub-chambers 2023 is two.

The freeze-dried cleaning agent is stored in the first storage sub-chamber 2021. The freeze-dried pre-activation agent is stored in the second storage sub-chamber 2022. The freeze-dried activation agent is stored in the third storage sub-chamber 2023.

Reaction Layer 300

The reaction layer 300 includes a plurality of distribution and reaction structures 330. The plurality of distribution and reaction structures 330 are distributed around the rotation center 11 and arranged at intervals.

The distribution and reaction structure 330 includes a first area sample addition hole 301, a separation chamber 302, a first area second microfluidic channel 322, a first area distributing chamber 304, a reaction unit 332, a first area fourth microfluidic channel 324, and a waste liquid storage chamber 310. The first area sample addition hole 301 is in communication with the separation chamber 302 via the first area third microfluidic channel 323. The separation chamber 302 is in communication with the first area distributing chamber 304 via the first area second microfluidic channel 322.

The reaction unit 332 includes a first area first microfluidic channel 321, a reaction chamber 306, a first area eighth microfluidic channel 328, a first area first reagent inlet port 308, a first area ninth microfluidic channel 329, and a first area second reagent inlet port 307. The reaction chamber 306 is in communication with the first area distributing chamber 304 via the first area first microfluidic channel 321. The reaction chamber 306 is in communication with the waste liquid storage chamber 310 via the first area fourth microfluidic channel 324. The first area first reagent inlet port 308 is in communication with the reaction chamber 306 via the first area eighth microfluidic channel 328. The magnetic beads coated with CTNI/NT-pro BNP/D-dimer/MYO/CKMB are stored in the reaction chamber 306. The first area first reagent inlet port 308 is closer to the rotation center 11 than the reaction chamber 306. The first area second reagent inlet port 307 is in communication with the reaction chamber 306 via the first area ninth microfluidic channel 329. The first area second reagent inlet port 307 is closer to the rotation center 11 than the reaction chamber 306.

In each distribution and reaction structure 330, the separation chamber 302 is an annular sector cavity extending along the rotational circumferential direction of the microfluidic chip 10. In each distribution and reaction structure 330, a plurality of reaction units 332 are provided. The plurality of reaction units 332 are uniformly distributed along the extending direction of the first area distributing chamber 304. The distances from the separation chamber 302, the first area distributing chamber 304, the reaction chamber 306, and the waste liquid storage chamber 310 to the rotation center 11 gradually increase.

The first area second microfluidic channel 322 includes a first sub-flow channel 3221, a second sub-flow channel 3222, and a third sub-flow channel 3223 which are communicated successively. The first sub-flow channel 3221 extends close to the rotation center 11 after being led out from the separation chamber 302. The first sub-flow channel 3221 is in communication with one end of the second sub-flow channel 3222. Another end of the second sub-flow channel 3222 is in communication with the third sub-flow channel 3223. The third sub-flow channel 3223 extends away from the rotation center 11 after being led out from the second sub-flow channel 3222 and is in communication with the first area distributing chamber 304. The first sub-flow channel 3221 is in communication with a first side surface 30213021 of the separation chamber 302. The first side surface 30213021 is a surface connecting a second side surface 30223022 of the separation chamber 302 close to the rotation center 11 and a third side surface 30233023 of the separation chamber 302 far away from the rotation center 11.

In each distribution and reaction structure 330, the separation chamber 302 is in communication with the waste liquid storage chamber 310 via the first area fifth microfluidic channel 325. The first area fifth microfluidic channel 325 is a U-shaped microfluidic channel. The opening of the first area fifth microfluidic channel 325 is away from the rotation center 11. The first area fifth microfluidic channel 325 is led out from one end of the second side surface 3022 of the separation chamber 302 close to the rotation center 11. The locations where the first area second microfluidic channel 322 and the first area fifth microfluidic channel 325 connect to the separation chamber 302 are respectively located on the opposite ends of the separation chamber 302.

The first area distributing chamber 304 extends along the rotational circumferential direction of the microfluidic chip 10. The width of the first area distributing chamber 304 in the radial direction remains consistent in the extending direction. In the radial direction of the microfluidic chip 10, the width of the first area distributing chamber 304 is narrower than the width of the separation chamber 302.

In each distribution and reaction structure 330, the first area distributing chamber 304 is in communication with the waste liquid storage chamber 310 via the first area sixth microfluidic channel 326. The first area sixth microfluidic channel 326 is led out from one end of the side surface of the separation chamber 302 close to the rotation center 11.

The first area fifth microfluidic channel 325 and the first area sixth microfluidic channel 326 converge and are in communication with one end of the first area seventh microfluidic channel 327. Another end of the first area seventh microfluidic channel 327 is in communication with the waste liquid storage chamber 310. The first area seventh microfluidic channel 327 is provided with a backflow prevention valve 312.

The first area fourth microfluidic channel 324 is provided with a first area second microfluidic valve 309.

The first area first microfluidic channel 321 is provided with a first area first microfluidic valve 305.

The plurality of storage units 130 in the sample and solvent addition layer 100 are in one-to-one correspondence with the plurality of liquid distribution units 230 in the common reagent layer 200. The third area sample addition hole 103 is in communication with the sample addition hole 204 via the first interlayer channel. The third area first connecting port 104 is in communication with the second area solvent addition hole 201 via the second interlayer channel. The third area second connecting port 111 is in communication with the second area second connecting port 210 via the third interlayer channel. The second area third connecting port 212 is in communication with the first area second reagent inlet port 307 via the fourth interlayer channel.

The plurality of liquid distribution units 230 in the common reagent layer 200 are in one-to-one correspondence with the plurality of reaction units 332 in the reaction layer 300. The second area first connecting port 209 is in communication with the first area first reagent inlet port 308 via the fifth interlayer channel. The second area sample addition hole 204 is in communication with the first area sample addition hole 301 via the sixth interlayer channel.

The microfluidic chip 10 further includes a second vent hole 402 and a first vent hole 401. One end of the second vent hole 402 is in communication with the reagent storage chamber 202, and another end of the second vent hole 402 is opened on one side surface of the microfluidic chip 10. One end of the first vent hole 401 is in communication with the waste liquid storage chamber 310, and another end of the first vent hole 401 is opened on one side surface of the microfluidic chip 10.

The detection method by using the microfluidic chip 10 in the above specific examples includes the following steps.

(1) A whole blood sample to be tested was loaded into a third area sample addition hole 103 of a chemical substance-labeled antibody layer (1). The microfluidic chip 10 was placed in a supporting centrifuge device. Pure water was added dropwise to the third area solvent addition hole 101. Under the rotation, the sample to be tested passes through the first interlayer channel, the sixth interlayer channel and the first area third microfluidic channel 323, and then arrives at the separation chamber 302 of the reaction layer 300, to separate. The pure water arrives at the third area second microfluidic valve 106 between the third area solvent addition hole 101 and the third area first connecting port 104, and the third area first microfluidic valve 105 between the third area solvent addition hole 101 and the third area distributing chamber 107, respectively.

(2) The speed of centrifugation is increased, so that the pure water breaks through the third area first microfluidic valve 105 and the third area second microfluidic valve 106. Then, the speed of centrifugation is reduced, so that the plasma separated from the whole blood sample passes through the first area second microfluidic channel 322 and enters the first area distributing chamber 304 under the action of capillary force. The pure water enters the third area distributing chamber 107 of the chemical substance-labeled antibody layer (1), and the reagent storage chamber 202 of the common reagent layer 200, respectively. The freeze-dried cleaning solution, the freeze-dried pre-excitation solution, and the freeze-dried excitation solution respectively stored in three reagent storage chambers 202 were respectively dissolved in the pure water.

(3) The speed of centrifugation is increased, so that the pure water breaks through the third area third microfluidic valve 108 behind the third area distributing chamber 107 of the sample and solvent addition layer 100, and enters the chemical substance-labeled antibody unit 109. The freeze-dried chemical substance-labeled antibody in the chemical substance-labeled antibody unit 109 is dissolved in the pure water. Meanwhile, the blood plasma breaks through the first area first microfluidic valve 305 behind the first area distributing chamber 304 of the reaction layer 300, and enters the reaction chamber 306.

(4) The variable-speed centrifugation was conducted to make the chemical substance-labeled antibody unit 109, the common reagent unit 202 and the reaction chamber 306 to simultaneously mix.

(5) The speed of centrifugation is increased, so that the chemical substance-labeled antibody breaks through the third area fourth microfluidic valve 110 behind the chemical substance-labeled antibody unit 109, passes through the third area second connecting port 111 and the second area second connecting port of the common reagent layer 200, and then enters the second area second microfluidic channel 211. Then, the speed of centrifugation is decreased, so that the chemical substance-labeled antibody passes through the second area second microfluidic channel 211 and the second area third connecting port 212, and then arrives at the reaction chamber 306 of the reaction layer 300.

(6) The variable-speed centrifugation was conducted to make the chemical substance-labeled antibody, the plasma, and the magnetic beads to mix in the reaction chamber 306.

(7) The speed of centrifugation is increased, so that the mixture in the reaction chamber 306 passes through the first area second microfluidic valve 309 followed the reaction chamber 306, and arrives at the waste liquid storage chamber 310. At this moment, the reaction chamber 306 has been filled with reagents. The cleaning solution in the common reagent layer 200 arrives at the second area distributing chamber 207. Then, the speed of centrifugation is decreased, so that the cleaning solution fills the second area distributing chamber 207.

(8) The speed of centrifugation is increased, so that the cleaning solution passes through the second area first connecting port 209, the fifth interlayer channel, and the first area first reagent inlet port 308, and then enters the reaction chamber 306. The pre-excitation solution arrives at the second area distributing chamber 207. Then, the speed of centrifugation is decreased, so that the pre-excitation solution fills the second area distributing chamber 207.

(9) The speed of centrifugation is increased, so that the cleaning solution arrives at the waste liquid storage chamber 310, the pre-excitation solution arrives at the reaction chamber 306, and the excitation solution arrives at the second area distributing chamber 207. Then, the speed of centrifugation is decreased, so that the excitation solution fills the second area distributing chamber 207.

(10) The speed of centrifugation is increased, so that the excitation solution arrives at the reaction chamber 306. The variable-speed centrifugation was conducted to uniformly mix.

(11) Chemiluminescence assay and light signal capture were conducted, the value was read, and thus the detection was completed.

The speed of rotation required in the above steps can range from 100 r/min to 10000 r/min, such as 500 r/min, 1000 r/min, 2000 r/min, etc. The rotation time can range from 1 second to 10 minutes, such as 10 seconds, 30 seconds, 1 minute, 5 minutes, etc.

The microfluidic chip 10 in this specific example integrates the detection of multiple samples and multiple items. During the detection, the tester just needs to drop the blood sample into the sample addition hole, and the solvent for subsequent dissolution can be uniformly added by the machine once installed. Multiple processes such as dissolution of reagents, mixing, centrifugation, constant volume, reaction, elution, and luminescence can be automatically performed by the machine.

The technical features of the above embodiments can be combined arbitrarily. In order to make the description concise, not all possible combinations of the technical features are described in the embodiments. However, the combinations should be considered as in the scope of the present disclosure as long as there is no contradiction in the combination of these technical features.

The above-described embodiments are only several implementations of the present disclosure, and the descriptions are relatively specific and detailed, but they should not be construed as limiting the scope of the present disclosure. It should be understood by those of ordinary skill in the art that various modifications and improvements can be made without departing from the concept of the present disclosure, and all fall within the protection scope of the present disclosure. Therefore, the patent protection of the present disclosure shall be defined by the appended claims.

What is claimed is:

1. A microfluidic chip having a rotation center and a reagent output structure, the reagent output structure comprising:

a reagent storage chamber, a first centrifugal-force flow channel, and a delay unit, wherein the delay unit comprises a first turning flow channel, a capillary-force flow channel, a second turning flow channel, and a second centrifugal-force flow channel, the first centrifugal-force flow channel extends away from the rotation center after being led out from the reagent storage chamber, one end of the first turning flow channel is in communication with the first centrifugal-force flow channel, and another end of the first turning flow channel is in communication with one end of the capillary-force flow channel, the capillary-force flow channel extends close to the rotation center after being led out from the first turning flow channel, one end of the second turning flow channel is in communication with another end of the capillary-force flow channel, and another end of the second turning flow channel is in communication with the second centrifugal-force flow channel, the second centrifugal-force flow channel extends away from the rotation center after being led out from the second turning flow channel, the first centrifugal-force flow channel has a first discharge microfluidic valve, and the second centrifugal-force flow channel has a second discharge microfluidic valve;

wherein a plurality of reagent output structures are provided, the plurality of reagent output structures surround the rotation center and are distributed at intervals, at least one reagent output structure comprises a plurality of delay units, the plurality of delay units are communicated successively, the first turning flow channel of a latter delay unit is in communication with the second centrifugal-force flow channel of a former delay unit, wherein at least one reagent output structure has a different number of delay units as compared to other reagent output structures; and the microfluidic chip further comprising a second area distributing chamber and a plurality of reaction chambers, wherein the second area distributing chamber extends around the rotation center and is in communication with the plurality of reagent output structures, the plurality of reaction chambers are in communication with the second area distributing chamber, respectively, and distances from the reagent output structure, the second area distributing chamber, and each reaction chamber to the rotation center gradually increase.

2. The microfluidic chip according to claim 1, wherein the first discharge microfluidic valve is a hydrophobic valve or a capillary valve; and or the second discharge microfluidic valve is a hydrophobic valve or a capillary valve.

3. The microfluidic chip according to claim 1, wherein the number of the delay units in each reagent output structure is different from the number of the delay units in other reagent output structures.

4. The microfluidic chip according to claim 1, wherein among the plurality of delay units that are communicated successively, the latter delay unit is farther away from the corresponding reagent storage chamber than the former delay unit.

5. The microfluidic chip according to claim 1, further comprising a common reagent layer and a reaction layer that are laminated, wherein the common reagent layer has the reagent output structure, the second area distributing chamber, a second area sample addition hole, a second area first microfluidic channel, and a plurality of second area second connecting ports, the plurality of second area second connecting ports are distributed along an extending direction of the second area distributing chamber, and the plurality of second area second connecting ports are in communication with the second area distributing chamber, respectively, and the second area second connecting port is farther away from the rotation center than the second area distributing chamber;

wherein the reaction layer has a distribution and reaction structure comprising a first area sample addition hole, a first area distributing chamber, and a reaction unit, the first area sample addition hole is in communication with the first area distributing chamber, the reaction unit comprises a first area first microfluidic channel and the reaction chamber, and the reaction chamber is in communication with the first area distributing chamber via the first area first microfluidic channel, the first area distributing chamber extends around the rotation center, the distribution and reaction structure has a plurality of reaction units, the plurality of reaction units are distributed along an extending direction of the first area distributing chamber, the first area distributing chamber is closer to the rotation center than the reaction chamber, the first area sample addition hole is in communication with the second area sample addition hole, and the reaction chamber is in communication with the second area second connecting port.

6. The microfluidic chip according to claim 5, wherein the reaction unit further comprises a first area first reagent inlet port and a first area eighth microfluidic channel, wherein the first area first reagent inlet port is in communication with the reaction chamber via the first area eighth microfluidic channel, the first area first reagent inlet port is closer to the rotation center than the reaction chamber, and the second area second connecting port is in communication with the reaction chamber via the first area first reagent inlet port and the first area eighth microfluidic channel.

7. The microfluidic chip according to claim 5, wherein the distribution and reaction structure further comprises a separation chamber and a first area second microfluidic channel, wherein the separation chamber is in communication with the first area distributing chamber via the first area second microfluidic channel, and the separation chamber is closer to the rotation center than the first area distributing chamber.

* * * * *